US012694810B2

(12) United States Patent
Kim et al.

(10) Patent No.: US 12,694,810 B2
(45) Date of Patent: Jul. 28, 2026

(54) GATE DRIVER, DISPLAY DEVICE INCLUDING THE SAME, AND ELECTRONIC DEVICE

(71) Applicant: Samsung Display Co., Ltd., Yongin-si (KR)

(72) Inventors: Jong Hee Kim, Yongin-si (KR); Bo Yong Chung, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/225,936

(22) Filed: Jun. 2, 2025

(65) Prior Publication Data

US 2026/0073828 A1 Mar. 12, 2026

(30) Foreign Application Priority Data

Sep. 12, 2024 (KR) ........................ 10-2024-0125079

(51) Int. Cl.
*G09G 3/20* (2006.01)

(52) U.S. Cl.
CPC ....... *G09G 3/20* (2013.01); *G09G 2310/0267* (2013.01); *G09G 2310/0286* (2013.01)

(58) Field of Classification Search
None
See application file for complete search history.

(56) References Cited

U.S. PATENT DOCUMENTS

| | | | | |
|---|---|---|---|---|
| 10,170,053 | B2 | 1/2019 | Noh et al. | |
| 11,127,339 | B2 | 9/2021 | Kim et al. | |
| 11,250,767 | B2 | 2/2022 | Park et al. | |
| 12,033,583 | B2 * | 7/2024 | Kim | G09G 3/3266 |

FOREIGN PATENT DOCUMENTS

| | | |
|---|---|---|
| KR | 10-2555084 B1 | 7/2023 |

* cited by examiner

*Primary Examiner* — Christopher J Kohlman
(74) *Attorney, Agent, or Firm* — Womble Bond Dickinson (US) LLP

(57) ABSTRACT

A display device includes: a display panel including pixels connected to scan lines; a gate driver including stages, a stage from among the stages being configured to: provide, as a carry signal, a carry clock signal of a carry clock line to a next stage from among the stages; and provide, as a scan signal, a scan clock signal of a scan clock line to a corresponding scan line from among the scan lines in response to a previous carry signal of a previous stage from among the stages; and a clock controller to connect the scan clock line to a power line in response to the carry clock signal, the power line being configured to provide a constant voltage.

20 Claims, 20 Drawing Sheets

GATE DRIVER, DISPLAY DEVICE INCLUDING THE SAME, AND ELECTRONIC DEVICE

CROSS-REFERENCE TO RELATED APPLICATION

The present application claims priority to and the benefit of Korean Patent Application No. 10-2024-0125079, filed on Sep. 12, 2024, in the Korean Intellectual Property Office, the entire disclosure of which is incorporated by reference herein.

BACKGROUND

1. Field

Aspects of embodiments of the present disclosure relate to a gate driver, a display device including the gate driver, and an electronic device.

2. Description of the Related Art

A display device displays an image using pixels. The display device may include a gate driver to drive the pixels.

SUMMARY

Embodiments of the present disclosure may be directed to a gate driver, a display device, and an electronic device, which may reduce a falling time of a scan signal.

In accordance with one or more embodiments of the present disclosure, a display device includes: a display panel including pixels connected to scan lines; a gate driver including stages, a stage from among the stages being configured to: provide, as a carry signal, a carry clock signal of a carry clock line to a next stage from among the stages; and provide, as a scan signal, a scan clock signal of a scan clock line to a corresponding scan line from among the scan lines in response to a previous carry signal of a previous stage from among the stages; and a clock controller configured to connect the scan clock line to a power line in response to the carry clock signal, the power line being configured to provide a constant voltage.

In accordance with an embodiment, each of the carry clock line and the scan clock line may extend from a first side of the display panel, at which a pad may be located, to a second side of the display panel, and the clock controller may be located adjacent to the second side of the display panel.

In accordance with an embodiment, the gate driver may further include a dummy stage configured to provide a carry signal to a previous stage, the dummy stage not being connected to the scan lines, and the clock controller may be located adjacent to the dummy stage.

In accordance with an embodiment, the gate driver may include the clock controller.

In accordance with an embodiment, the stage may be configured to output, as the carry signal, a first carry clock signal of a first carry clock line, and the clock controller may include a first switching transistor connected between the scan clock line and the power line, the first switching transistor including a gate electrode connected to a second carry clock line.

In accordance with an embodiment, the first switching transistor may include an oxide semiconductor.

In accordance with an embodiment, each of the carry clock signal and the scan clock signal may include a square wave cyclically having a gate-on voltage and a gate-off voltage, and the carry clock signal of the second carry clock line may have a phase delayed by a pulse width of the scan clock signal having the gate-on voltage compared to the first carry clock signal of the first carry clock line.

In accordance with an embodiment, the power line may be configured to receive the gate-off voltage, and the clock controller may be configured to connect the scan clock line to the power line in response to the carry clock signal having the gate-on voltage to reduce a falling time of each of the scan clock signal and the scan signal.

In accordance with an embodiment, the display panel may further include: first to sixth carry clock lines configured to receive first to sixth carry clock signals, respectively; and first to sixth scan clock lines configured to receive first to sixth scan clock signals, respectively. The first to sixth carry clock signals may have the same waveforms as each other, and different phases from each other. The first to sixth scan clock signals may have the same waveforms as each other, and the same phases as those of the first to sixth carry clock signals, respectively. The clock controller may be configured to: pull down the first scan clock signal in response to the third carry clock signal; pull down the second scan clock signal in response to the fourth carry clock signal; pull down the third scan clock signal in response to the fifth carry clock signal; pull down the fourth scan clock signal in response to the sixth carry clock signal; pull down the fifth scan clock signal in response to the first carry clock signal; and pull down the sixth scan clock signal in response to the second carry clock signal.

In accordance with an embodiment, the clock controller may include: an eleventh switching transistor connected between the first scan clock line and the power line, the eleventh switching transistor comprising a gate electrode connected to the third carry clock line; a twelfth switching transistor connected between the second scan clock line and the power line, the twelfth switching transistor comprising a gate electrode connected to the fourth carry clock line; a thirteenth switching transistor connected between the third scan clock line and the power line, the thirteenth switching transistor comprising a gate electrode connected to the fifth carry clock line; a fourteenth switching transistor connected between the fourth scan clock line and the power line, the fourteenth switching transistor comprising a gate electrode connected to the sixth carry clock line; a fifteenth switching transistor connected between the fifth scan clock line and the power line, the fifteenth switching transistor comprising a gate electrode connected to the first carry clock line; and a sixteenth switching transistor connected between the sixth scan clock line and the power line, the sixteenth switching transistor comprising a gate electrode connected to the second carry clock line.

In accordance with an embodiment, the stage may be configured to output, as the carry signal, a first carry clock signal of a first carry clock line. The clock controller may include a first switching transistor and a second switching transistor connected in series to each other between the scan clock line and the power line. A gate electrode of the first switching transistor may be connected to a second carry clock line, and a gate electrode of the second switching transistor may be connected to the first carry clock line.

In accordance with an embodiment, each of the carry clock signal and the scan clock signal may include a square wave cyclically having a gate-on voltage and a gate-off voltage. The carry clock signal of the first carry clock line may have the same waveform and the same phase as those of the scan clock signal, and the carry clock signal of the second carry clock line may have a phase delayed by a pulse width of the carry clock signal having the gate-on voltage compared to the carry clock signal of the first carry clock line.

In accordance with an embodiment, the constant voltage of the power line may have a voltage level lower than a voltage level of the gate-off voltage.

In accordance with an embodiment, the stage may include: a first transistor diode-connected between a previous carry line configured to receive the previous carry signal and a Q node; a second transistor connected between the carry clock line and a first output terminal configured to output the carry signal, the second transistor including a gate electrode connected to the Q node; a third transistor connected between the first output terminal and a low power line, the third transistor including a gate electrode connected to a QB node; a fourth transistor connected between the scan clock line and a second output terminal configured to output the scan signal, the fourth transistor including a gate electrode connected to the Q node; and a fifth transistor connected between the second output terminal and the low power line, the fifth transistor including a gate electrode connected to the QB node. The stage may not include a transistor connecting the second output terminal and the low power line to each other in response to a next carry signal of a next stage.

In accordance with one or more embodiments of the present disclosure, a gate driver includes: stages; and a clock control circuit. A stage from among the stages is configured to: provide, as a carry signal, a carry clock signal of a carry clock line to a next stage; and output, as a scan signal, a scan clock signal of a scan clock line in response to a previous carry signal of a previous stage. The clock control circuit may be configured to pull down the scan clock line to a gate-off voltage in response to the carry clock signal.

In accordance with an embodiment, the gate driver may further include a dummy stage configured to provide a carry signal to a previous stage, and not output a scan signal. The clock control circuit may be located adjacent to the dummy stage.

In accordance with an embodiment, the stage may be configured to output, as the carry signal, a first carry clock signal of a first carry clock line, and the clock control circuit may include a first switching transistor connected between the scan clock line and a power line configured to provide a constant voltage, the first switching transistor including a gate electrode connected to a second carry clock line.

In accordance with an embodiment, each of the carry clock signal and the scan clock signal may include a square wave cyclically having a gate-on voltage and a gate-off voltage, and the carry clock signal of the second carry clock line may have a phase delayed by a pulse width of the scan clock signal having the gate-on voltage compared to the first carry clock signal of the first carry clock line.

In accordance with an embodiment, the stage may be configured to output, as the carry signal, a first carry clock signal of a first carry clock line, the clock control circuit may include a first switching transistor and a second switching transistor connected in series to each other between the scan clock line and a power line configured to provide a constant voltage, a gate electrode of the first switching transistor may be connected to a second carry clock line, and a gate electrode of the second switching transistor may be connected to the first carry clock line.

In accordance with an embodiment, each of the carry clock signal and the scan clock signal may include a square wave cyclically having a gate-on voltage and a gate-off voltage, the carry clock signal of the first carry clock line may have the same waveform and the same phase as those of the scan clock signal, and the carry clock signal of the second carry clock line may have a phase delayed by a pulse width of the carry clock signal having the gate-on voltage compared to the carry clock signal of the first carry clock line.

In accordance with one or more embodiments of the present disclosure, an electronic device includes: a processor configured to provide input image data; and a display device configured to display an image based on the input image data, and including: a display panel including pixels connected to scan lines; a gate driver including stages, a stage from among the stages being configured to: provide, as a carry signal, a carry clock signal of a carry clock line to a next stage from among the stages; and provide, as a scan signal, a scan clock signal of a scan clock line to a corresponding scan line from among the scan lines in response to a previous carry signal of a previous stage from among the stages; and a clock controller configured to connect the scan clock line to a power line in response to the carry clock signal, the power line being configured to provide a constant voltage.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
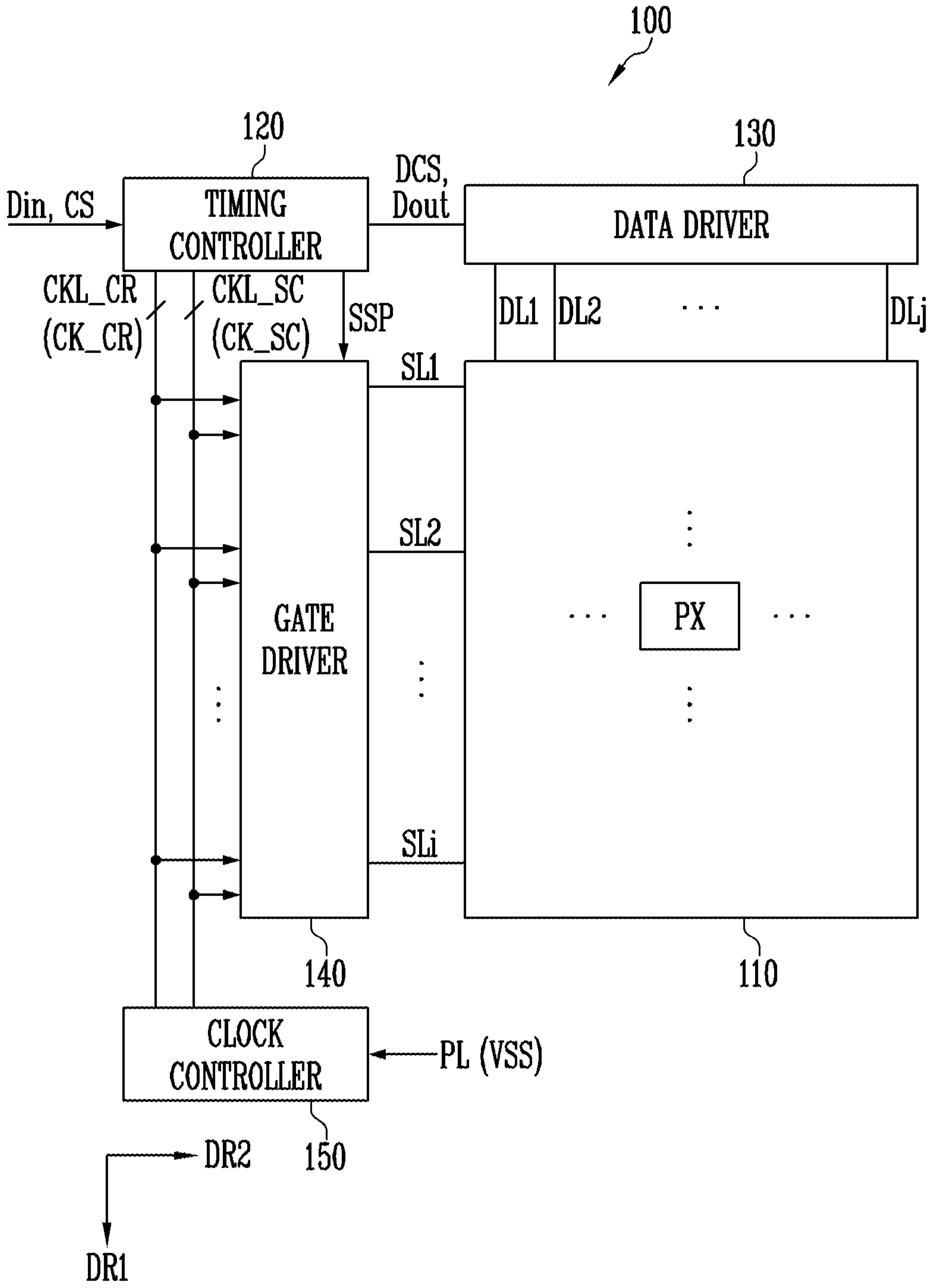
FIG. 1 is a diagram illustrating a display device in accordance with some embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the present disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the present disclosure. Also, in some embodiments, the blocks, the units, and/or the modules may be physically separated into more complex blocks, more complex units, and/or more complex modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a display device in accordance with some embodiments of the present disclosure.

Referring to FIG. 1, the display device 100 may include a display panel 110 (e.g., a pixel unit), a timing controller 120, a data driver 130, a gate driver 140, and a clock controller 150 (e.g., a clock control circuit). These components may be implemented as separate integrated circuits, or two or more of these components may be implemented to be integrated together into a single integrated circuit. In addition, the gate driver 140 may be formed in the display panel 110.

The display panel 110 may include pixels PX (or sub-pixels) connected to scan lines SL1, SL2, . . . , and SLi and data lines DL1, DL2, . . . , and DLj, where each of i and j may be a natural number of 3 or more.

The pixels PX may be configured with various suitable kinds of circuits known to those having ordinary skill in the art, and the number of scan lines connected to each of the pixels PX may be variously modified corresponding to a structure of the pixels PX. In addition, each of the pixels PX may be additionally connected to an emission control line corresponding to the structure of the pixels PX.

The pixels PX may be selected in a unit of a horizontal line (e.g., the pixels PX connected to the same scan line as each other may be classified as one horizontal line (e.g., a pixel row)) when a scan signal is supplied to the scan lines SL1 to SLi. Each of the pixels PX selected by the scan signal may be supplied with a data signal from a data line (e.g., any one of the data lines DL1 to DLj) connected to the corresponding pixel PX. The pixel PX supplied with the data signal may generate light having a luminance corresponding to a voltage of the data signal.

The data lines DL1 to DLj may extend in a first direction DR1. The first direction DR1 may be, for example, a direction connecting an upper side and a lower side of the display panel 110 to each other. As another example, the first direction DR1 may be a direction connecting a left side and a right side of the display panel 110 to each other, and be referred to as another direction.

The scan lines SL1 to SLi may extend in a second direction DR2. The second direction DR2 may be a direction crossing or intersecting the first direction DR1. The second direction DR2 may be a direction connecting the left side and the right side of the display panel 110 to each other. As another example, the second direction DR2 may be a direction connecting the upper side and the lower side of the display panel 110 to each other, and be referred to as another direction.

The timing controller 120 may receive input data Din and a control signal CS from a host system through an interface. As an example, the timing controller 120 may receive the input data Din and the control signal CS from at least one of a Graphics Processing Unit (GPU), a Central Processing Unit (CPU), or an Application Processor (AP), which are included in the host system. Various signals including a clock signal may be included in the control signal CS.

The timing controller 120 may generate a data driving signal DCS based on the control signal CS, and may supply the generated data driving signal DCS to the data driver 130. The timing controller 120 may realign the input data Din to be suitable for specifications of the display device 100. Also, the timing controller 120 may generate output data Dout by correcting the input data Din, and may supply the output data Dout to the data driver 130. In an embodiment, the timing controller 120 may correct the input data Din corresponding to an optical measurement result measured in a processing process.

The timing controller 120 may provide clock lines CKL_CR and CKL_SC with clock signal CK_CR and CK_SC used for driving of the gate driver 140. For example, the timing controller 120 may provide a carry clock signal CK_CR to a carry clock line CKL_CR, and may provide a scan clock signal CK_SC to a scan clock line CKL_SC. Also, the timing controller 120 may provide a scan start signal SSP to the gate driver 140.

The data driver 130 may receive the output data Dout and the data driving signal DCS from the timing controller 120. The data driving signal DCS may include a sampling signal and/or timing signals used for driving of the data driver 130. The data driver 130 may generate a data signal based on the data driving signal DCS and the output data Dout. In an example, the data driver 130 may generate an analog data signal based on a grayscale (e.g., a grayscale level or a grayscale value) of the output data Dout. The data driver 130 may supply a data signal to the data lines DL1 to DLj to be synchronized with the scan signal.

The gate driver 140 may receive the scan start signal SSP from the timing controller 120. Also, the gate driver 140 may receive the clock signals CK_CR and CK_SC from the timing controller 120 through the clock lines CKL_CR and CKL_SC. The gate driver 140 may generate the scan signal while shifting the scan start signal SSP corresponding to the clock signals, and may sequentially supply the scan signal to the scan lines SL1 to SLi.

The gate driver 140 may include a plurality of stages connected to each of the scan lines SL1 to SLi. A stage ST (e.g., see FIG. 2) may be configured as a shift register, and may provide the carry clock signal CK_CR as a carry signal to a next stage in response to the scan start signal SSP or a carry signal of a previous stage. The stage ST may provide the scan clock signal CK_SC as a scan signal to a scan line (e.g., any one of SL1 to SLi) connected to the stage ST.

When the scan signal is supplied, a gate-on voltage at which a transistor supplied with the scan signal is turned on may be supplied to the scan lines SL1 to SLi. In addition, when the scan signal is not supplied (e.g., a supply suspension), a gate-off voltage at which the transistor is turned off may be supplied to the scan lines SL1 to SLi. As an example, a scan signal having a low level may be supplied to a P-type transistor, and a scan signal having a high level may be supplied to an N-type transistor. Hereinafter, for convenience of illustration, the scan signal having a high level voltage may be described as being supplied.

In an embodiment, the gate driver 140 may be a separate Integrated Circuit (IC) in the display device 100. In an embodiment, the gate driver 140 may be formed together with the pixels PX in a process of forming the display panel 110. For example, the gate driver 140 may be formed in an Oxide Semiconductor thin film transistor Gate driver circuit (OSG) or an Amorphous Silicon thin film transistor Gate driver circuit (ASG) in the display panel 110.

The clock controller 150 may be connected to the clock lines CKL_CR and CKL_SC and a power line PL (e.g., a low power line). A constant or substantially constant voltage (e.g., a low voltage VSS) may be applied to the power line PL. The clock controller 150 may pull down or reset the scan clock signal CK_SC to the low voltage VSS in response to the carry clock signal CK_CR. For example, the clock controller 150 may connect the scan clock line CKL_SC to the power line PL in response to the carry clock signal CK_CR. As described in more detail below, when a delay (e.g., an RC delay) occurs in a scan signal, some of the scan signals may overlap with each other due to the delay of the scan signal, a data signal may not be accurately written to the pixels PX, and a display quality may be deteriorated. Thus, the clock controller 150 may pull down the scan clock signal CK_SC using the carry clock signal CK_CR, thereby reducing a failing time of the scan clock signal CK_SC and the scan signal, and reducing, minimizing, or preventing the overlapping of the scan signals. A configuration and an operation of the clock controller 150 will be described in more detail below with reference to FIGS. 4 to 12.

In an embodiment, the clock controller 150 may be formed together with the pixels PX in a process of forming the display panel 110. However, the present disclosure is not limited thereto.

In an embodiment, the display device 100 may include a flat or substantially flat display device, a curved display device in which a portion of the display panel 110 is curved, a flexible display device in which a portion of the display panel 110 may be folded or bent, and a stretchable display device in which a portion of the display panel 110 may be expanded/contracted.

In an embodiment, the display device 100 is a device that displays moving images and/or still images, and may include or be implemented in various suitable portable electronic devices, such as a mobile phone, a smartphone, a tablet personal computer (PC), a smart watch, a watch phone, a portable multimedia player (PMP), a navigation system, and an ultra mobile computer (UMPC). In an embodiment of the present disclosure, the display device 100 may include or be implemented in various suitable electronic devices, such as a television, a notebook computer, a monitor, an advertisement board, and an Internet of things (IOT) device.

As described above, the clock controller 150 pulls down the scan clock signal CK_SC using the carry clock signal CK_CR, thereby reducing the falling time of each of the scan clock signal CK_SC and the scan signal.

Figure 2:
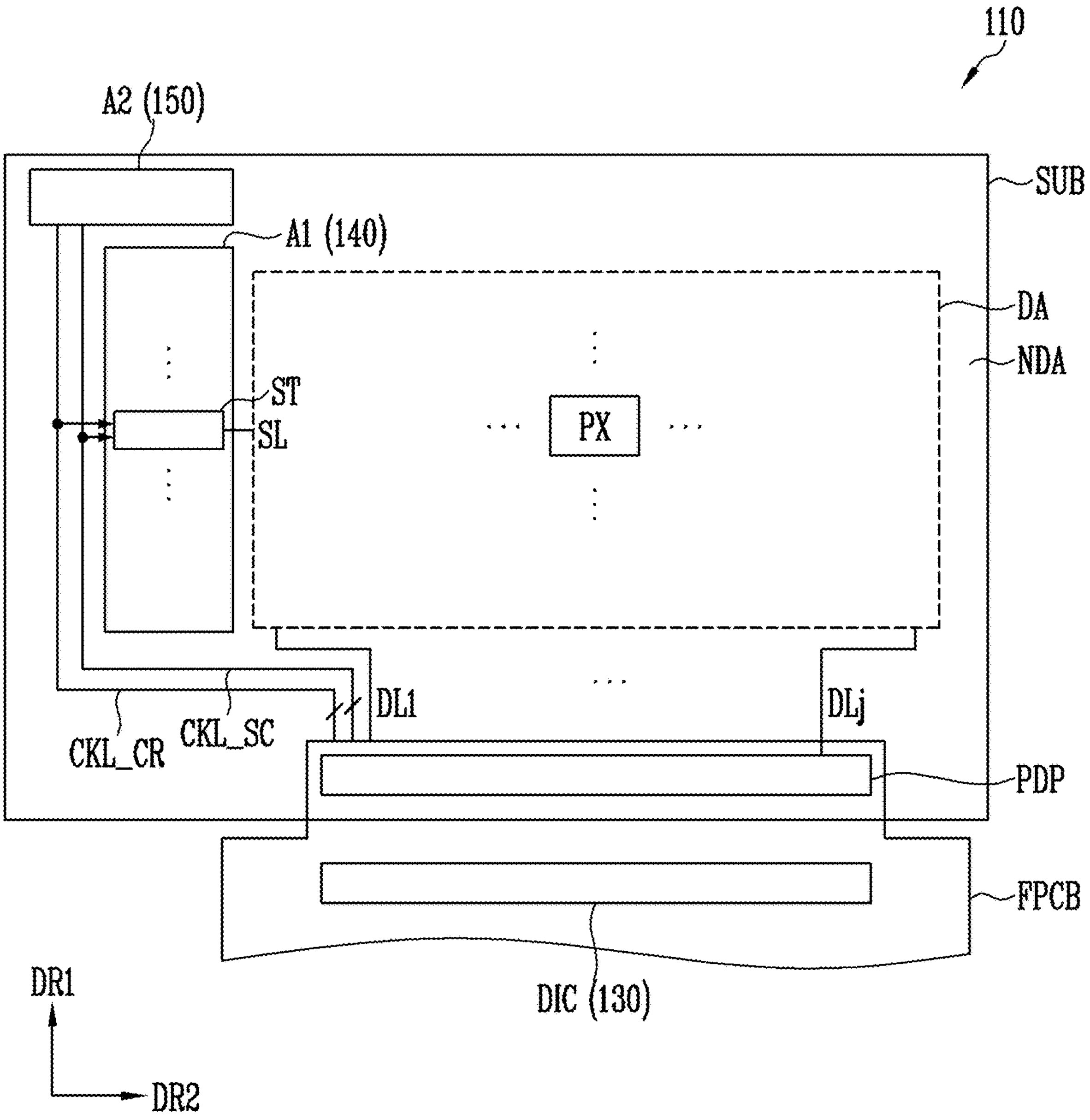
FIG. 2 is a diagram illustrating the display device shown in FIG. 1 in accordance with an embodiment.
Figure 3:
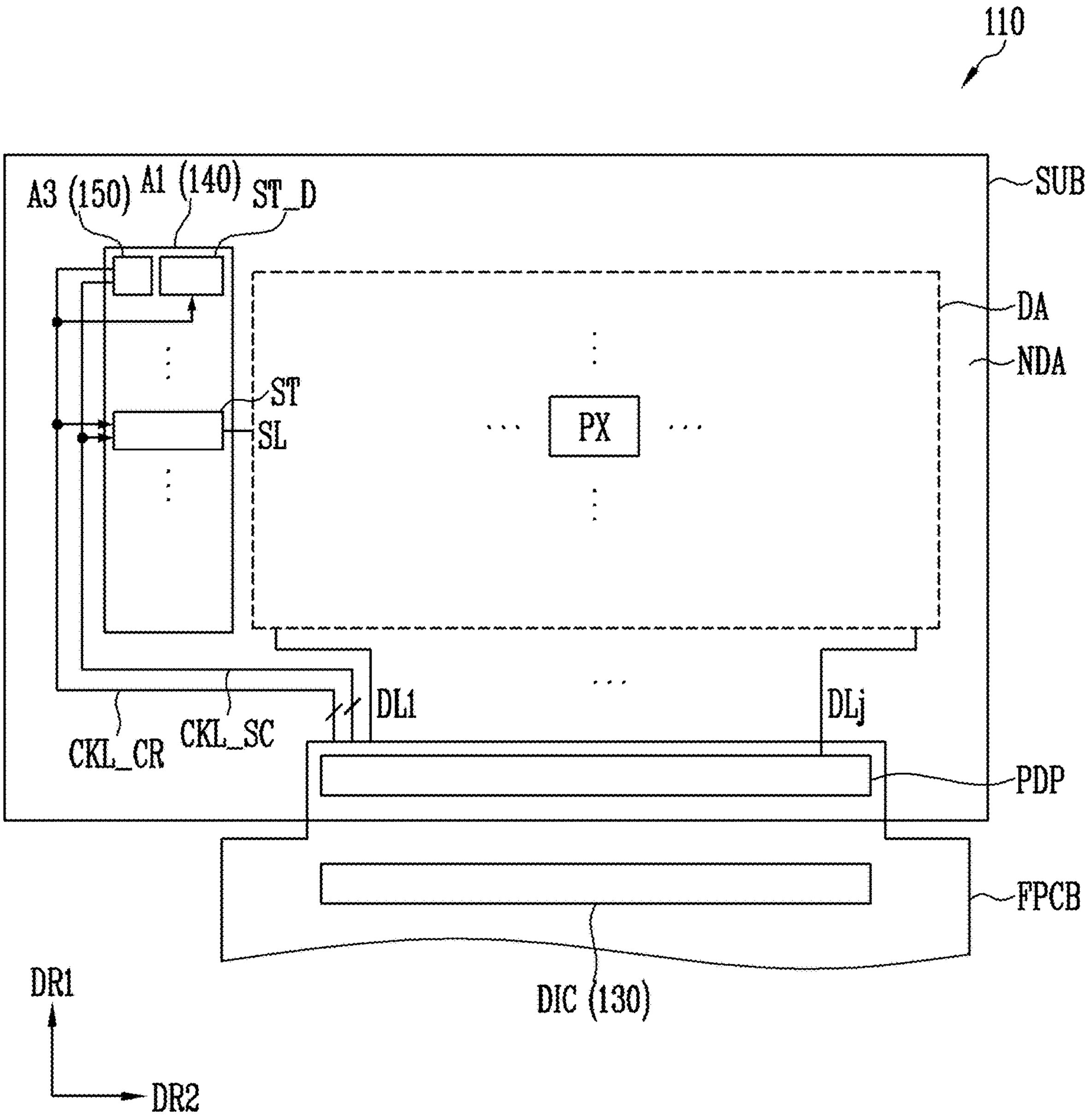
FIG. 3 is a diagram illustrating the display device shown in FIG. 1 in accordance with an embodiment.

FIG. 2 is a diagram illustrating the display device shown in FIG. 1 in accordance with an embodiment. FIG. 3 is a diagram illustrating the display device shown in FIG. 1 in accordance with an embodiment. Some other embodiments of an arrangement position of the clock controller 150 may be described hereinafter with reference to FIGS. 2 and 3.

Referring to FIGS. 1 to 3, the display panel 110 may include a substrate SUB and pixels PX.

The substrate SUB may include a transparent insulating material to allow light to be transmitted through the substrate SUB. The substrate SUB may be a rigid substrate or a flexible substrate.

The rigid substrate may be one of a glass substrate, a quartz substrate, a glass ceramic substrate, or a crystalline glass substrate.

The flexible substrate may be one of a film substrate or a plastic substrate, which may include a polymer organic material. For example, the flexible substrate may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, or cellulose acetate propionate. However, the present disclosure is not limited thereto.

One area of the substrate SUB may be provided as a display area DA where the pixels PX are disposed, and another area of the substrate SUB may be provided as a non-display area NDA.

A line portion, a pad portion PDP (e.g., a pad), and/or a built-in circuit, which may be used to drive the pixels PX, may be disposed in the non-display area NDA.

Clock lines CKL_CR and CKL_SC may be disposed in the non-display area NDA, and may extend from a first side (e.g., a lower side) of the display panel 110, at which the pad portion PDP is located, in the first direction DR1 to a second side (e.g., an upper side) opposite to the first side.

The gate driver 140 may be disposed in a first area A1 disposed at one side (e.g., a left side) of the display area DA in the second direction DR2.

In an embodiment, the clock controller 150 may be located adjacent to the second side of the display panel 110 in the first direction DR1. An example will be described in more detail hereinafter with reference to FIG. 2. The clock controller 150 may be disposed in the second area A2 located adjacent to the second side of the display panel 110 in the first direction DR1. Because a delay may more frequently occur in clock signals as they become more distant from the pad portion PDP, the clock controller 150 may be located in the second area A2 spaced apart from the pad portion PDP. However, the present disclosure is not limited thereto. For example, the clock controller 150 may be connected to another portion (e.g., an intermediate portion) of each of the clock lines CKL_CR and CKL_SC, instead of to an end portion of each of the clock lines CKL_CR and CKL_SC.

In an embodiment, the clock controller 150 may be disposed in the first area A1 in which the gate driver 140 is disposed, or may be included in the gate driver 140.

An example will be described in more detail hereinafter with reference to FIG. 3. The gate driver 140 may include a stage ST and a dummy stage ST_D, and the clock controller 150 may be disposed in a third area A3 adjacent to the dummy stage ST_D. The stage ST may be connected to a carry clock line CKL_CR, a scan clock line CKL_SC, and a scan line SL. The dummy stage ST_D may be connected to the carry clock line CKL_CR, and may not be connected to the scan clock line CKL_SC and the scan line SL. The dummy stage ST_D may be provided in the gate driver 140 to provide a carry signal (e.g., see FIG. 14) to a previous stage (e.g., a last stage), and may not include some components for outputting a scan signal. Accordingly, the third area A3 corresponding to where the some components would have been included may exist at one side of the dummy stage ST_D, and the clock controller 150 may be disposed in the third area A3.

The pad portion PDP may be located adjacent to one side (e.g., a lower side) of the display panel 110 in the first direction DR1, may provide a data signal to the data lines DL1 to DLj, and may provide clock signals to the clock lines CKL_CR and CKL_SC.

A circuit board FPCB may be connected to the display panel 110 through the pad portion PDP. The circuit board FPCB may be a flexible circuit board, but the present disclosure is not limited thereto.

The circuit board FPCB may process various signals input from a printed circuit board, and may output the processed signals toward the display panel 110. One end of the circuit board FPCB may be attached to the display panel 110, and an opposite end of the circuit board FPCB may be attached to the printed circuit board. The circuit board FPCB may be connected to each of the display panel 110 and the printed circuit board by a conductive adhesive member (e.g., an anisotropic conductive film).

A driver DIC may be mounted on the circuit board FPCB. The driver DIC may be, for example, an integrated circuit (IC). The driver DIC may include the data driver 130.

As described above, in some embodiments, the clock controller 150 may be located adjacent to the other end portions of the clock lines CKL_CR and the CKL_SC. Also, the clock controller 150 may be included in the gate driver 140, and be located adjacent to the dummy stage ST_D.

Figure 4:
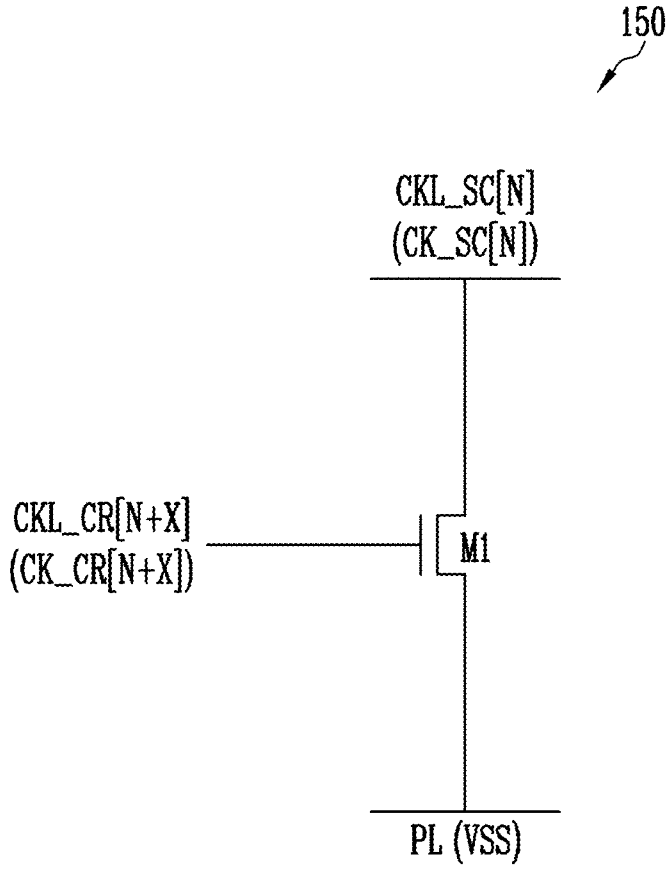
FIG. 4 is a diagram illustrating a clock controller included in the display device shown in FIG. 1 in accordance with an embodiment.
Figure 5:
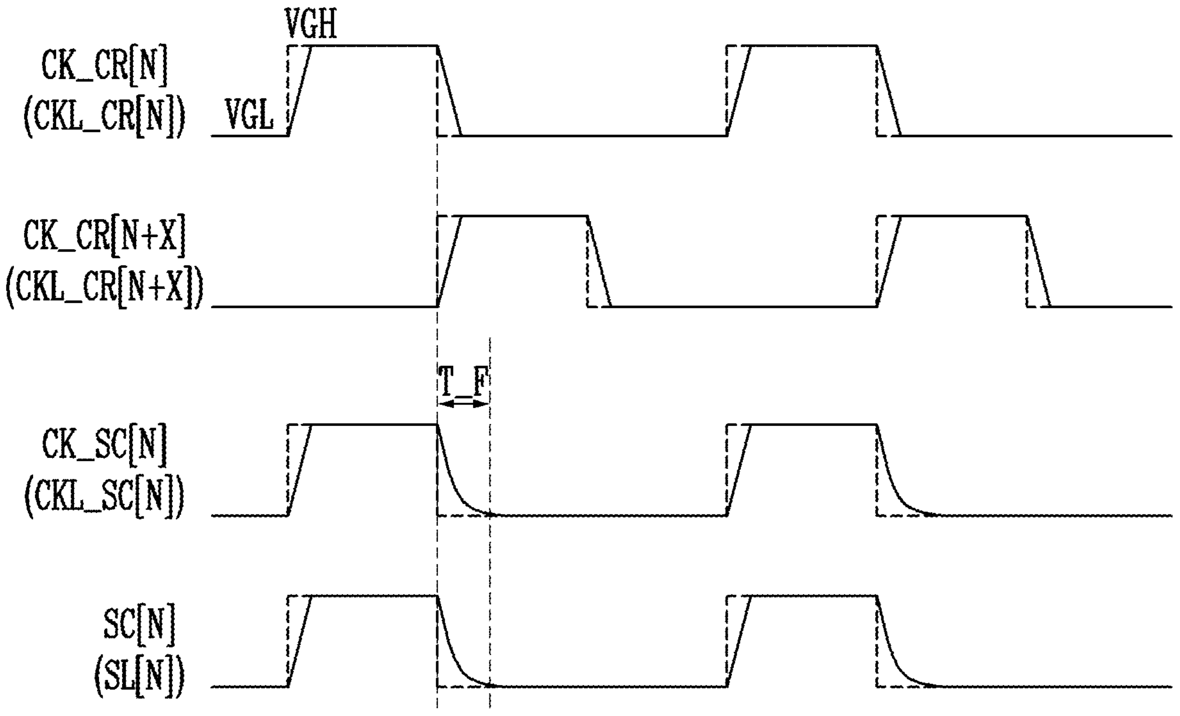
FIG. 5 is a waveform diagram illustrating an operation of the clock controller shown in FIG. 4.

FIG. 4 is a diagram illustrating the clock controller included in the display device shown in FIG. 1 in accordance with an embodiment. FIG. 5 is a waveform diagram illustrating an operation of the clock controller shown in FIG. 4.

Referring to FIGS. 4 and 5, the clock controller 150 may include a first switching transistor M1 (e.g., a pull-down buffer), which is connected between an Nth clock line CKL_SC[N] and the power line PL. The first switching transistor M1 may include a gate electrode connected to an (N+X)th carry clock line CKL_CR[N+X]. Here, each of N and X may be a natural number of 1 or more.

In an embodiment, the first switching transistor M1 may include an oxide semiconductor. A leakage current through the first switching transistor M1 may be decreased. The first switching transistor M1 may be an N-type transistor, but the present disclosure is not limited thereto.

An Nth carry clock signal CK_CR[N] may be provided to an Nth carry clock line CKL_CR[N], an (N+X)th carry clock signal CK_CR[N+X] may be provided to the (N+X)th carry clock line CKL_CR[N+X] (e.g., a second carry clock line), and an Nth scan clock signal CK_SC[N] may be provided to the Nth scan clock line CKL_SC[N] (e.g., a first carry clock line). Each of the Nth carry clock signal CK_CR [N], the (N+X)th carry clock signal CK_CR[N+X], and the Nth scan clock signal CK_SC[N] may be a square wave cyclically having a high level VGH (e.g., a gate-on voltage) and a low level VGL (e.g., a gate-off voltage). The (N+X)th carry clock signal CK_CR[N+x] may have a phase that is delayed by a width of a pulse having the high level VGH (e.g., a gate-on voltage) from the Nth carry clock signal CK_CR[N]. For example, at a time point at which the Nth carry clock signal CK_CR[N] is changed from the high level VGH to the low level VGL, the (N+X)th carry clock signal CK_CR[N+X] may be changed from the low level VGL to the high level VGH. The Nth carry clock signal CK_CR[N] and the Nth scan clock signal CK_SC[N] may have the same waveform and the same phase as each other. The Nth carry clock signal CK_CR[N] and the Nth scan clock signal CK_SC[N] may be provided to the same stage ST (e.g., see FIGS. 2 and 3), and the stage ST may output the Nth carry clock signal CK_CR[N] as an Nth carry signal CR[N] to the Nth carry clock line CKL_CR[N], and may output the Nth scan clock signal CK_SC[N] as an Nth scan signal SC[N] to an Nth scan line SL[N].

At a time point at which the Nth scan clock signal CK_SC[N] is changed from the high level VGH to the low level VGL, the (N+X)th carry clock signal CK_CR[N+X] may be changed from the low level VGL to the high level VGH, and the first switching transistor M1 may connect the Nth scan clock line CKL_SC[N] to the power line PL in response to the (N+X)th carry clock signal CK_CR[N+X] to pull down the Nth scan clock signal CK_SC[N] to the low voltage VSS of the power line PL. A voltage level of the low voltage VSS may be equal to or substantially equal to the low level VGL (e.g., a gate-off voltage). For example, the gate-off voltage may be applied to the power line PL. Accordingly, the Nth scan clock signal CK_SC[N] may be more rapidly changed to have the gate-off voltage. In other words, a falling time T_F of the Nth scan clock signal CK_SC[N] may be reduced.

As described above, the clock controller 150 pulls down the Nth scan clock signal CK_SC[N] in response to the (N+X)th carry clock signal CK_CR[N+X], thereby reducing a falling time of each of the Nth scan clock signal CK_SC [N] and the Nth scan signal SC[N].

Figure 6:
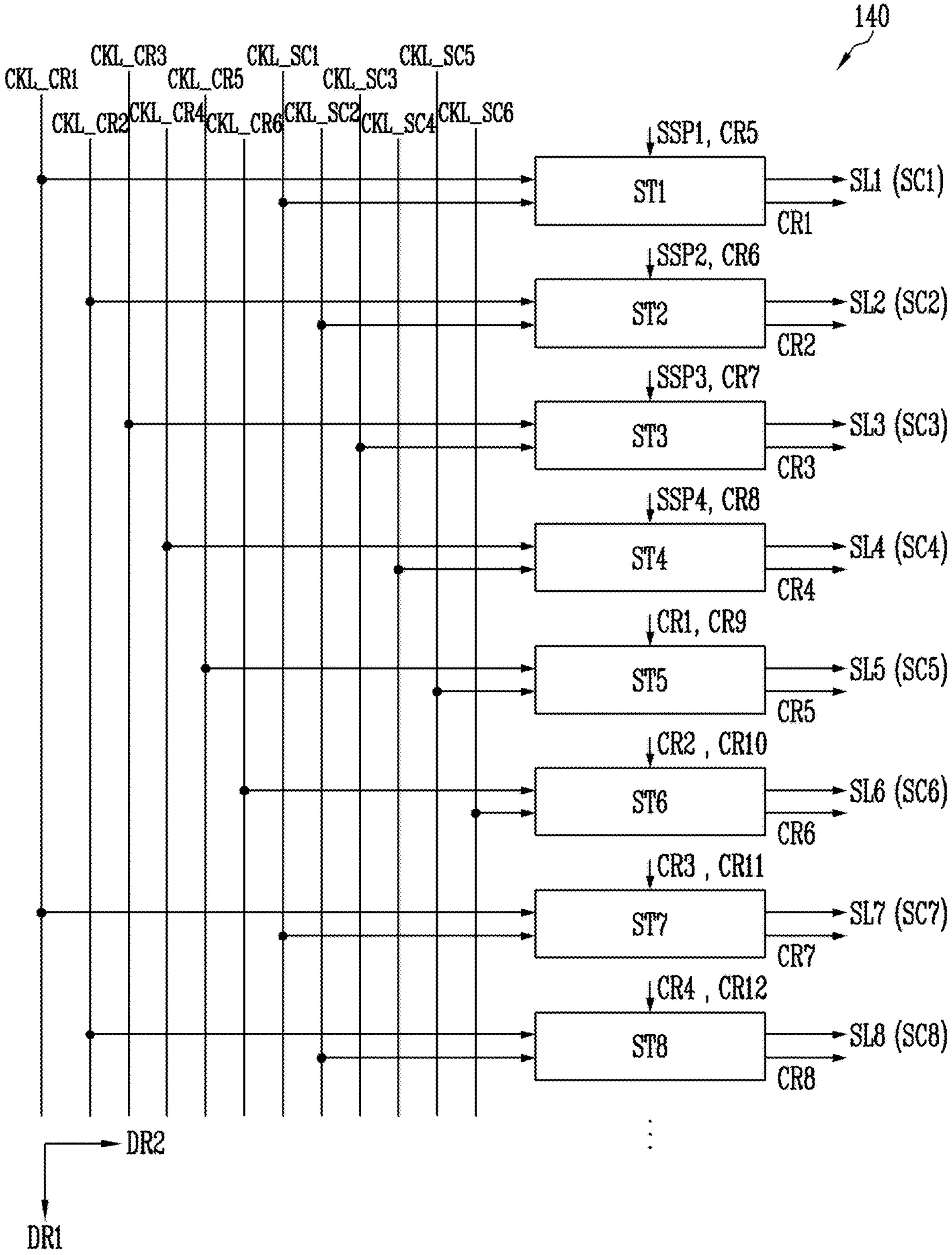
FIG. 6 is a diagram illustrating a gate driver included in the display device shown in FIG. 1 in accordance with an embodiment.
Figure 7:
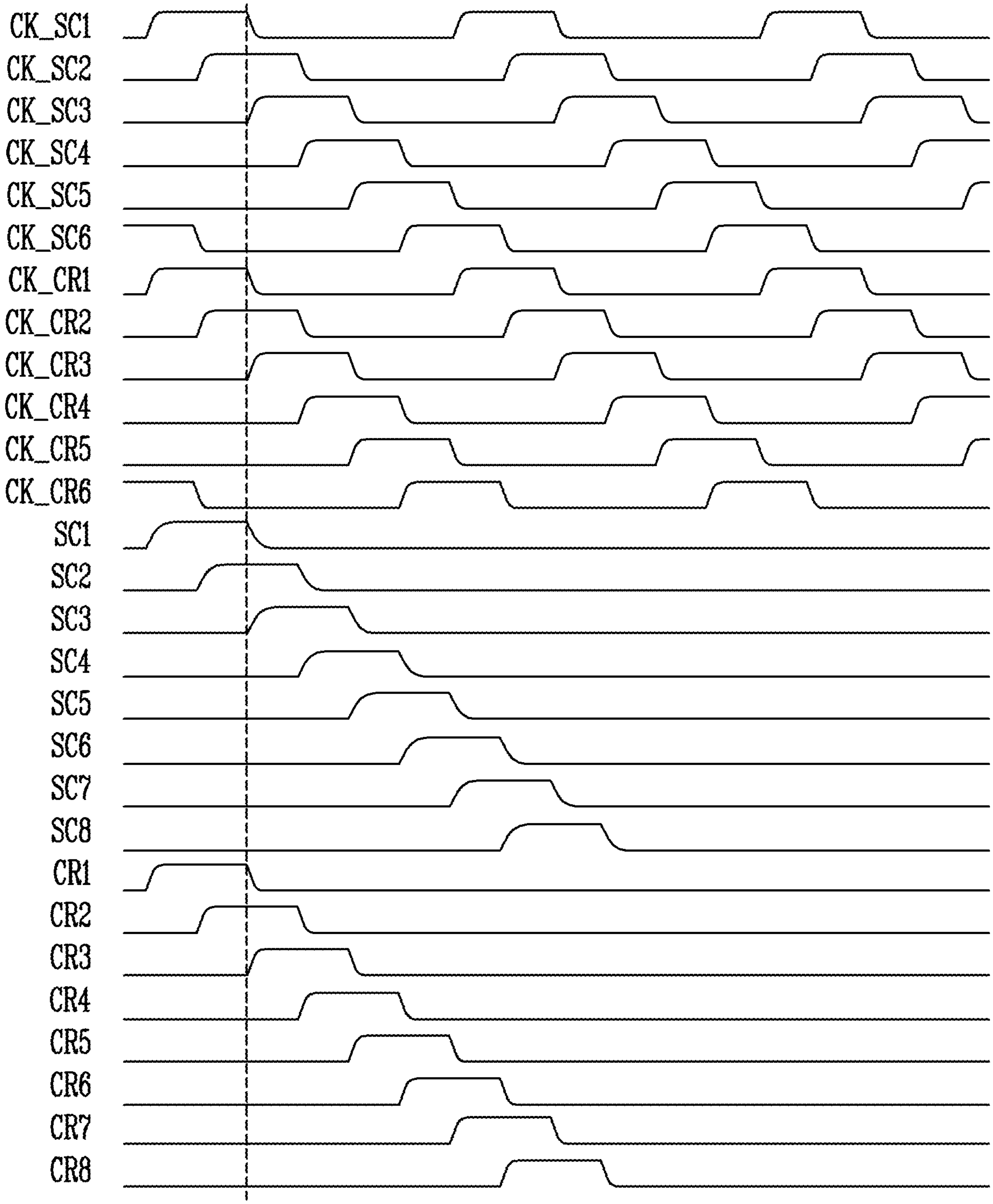
FIG. 7 is a waveform diagram illustrating signals measured in the gate driver shown in FIG. 6.
Figure 8:
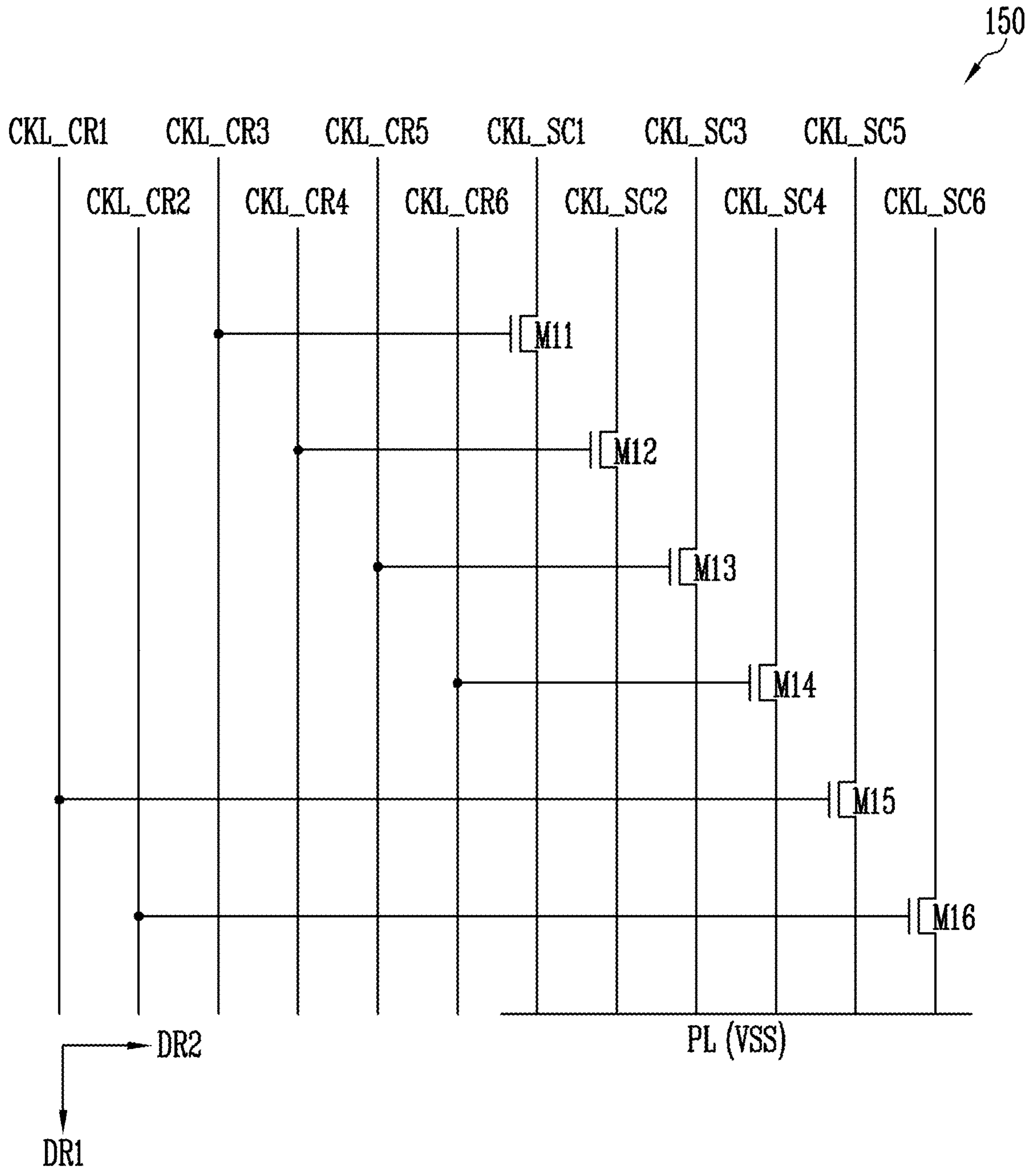
FIG. 8 is a diagram illustrating a clock controller included in the display device shown in FIG. 1 in accordance with an embodiment.

FIG. 6 is a diagram illustrating the gate driver included in the display device shown in FIG. 1 in accordance with an embodiment. FIG. 7 is a waveform diagram illustrating signals measured in the gate driver shown in FIG. 6. FIG. 8 is a diagram illustrating the clock controller included in the display device shown in FIG. 1 in accordance with an embodiment.

Referring to FIGS. 6 to 8, the gate driver 140 may include stages ST1, ST2, ST3, ST4, ST5, ST6, ST7, ST8, . . . .

Each of the stages ST1 to ST8 may be connected to a corresponding carry clock line among carry clock lines CKL_CR1 to CKL_CR6, a corresponding scan clock line among scan clock lines CKL_SC1 to CKL_SC6, and a corresponding scan line among scan lines SL1 to SL8, and be arranged along the first direction DR1. Each of the stages ST1 to ST8 may output a carry signal and a scan signal, in response to a scan start signal or a carry signal (e.g., a previous carry signal) of a previous stage.

The carry clock lines CKL_CR1 to CKL_CR6 may extend in the first direction DR1, and may be arranged along the second direction DR2. The carry clock lines CKL_CR1 to CKL_CR6 may include a first carry clock line CKL_CR1 to which a first carry clock signal CK_CR1 is provided, a second carry clock line CKL_CR2 to which a second carry clock signal CK_CR2 is provided, a third carry clock line CKL_CR3 to which a third carry clock signal CK_CR3 is provided, a fourth carry clock line CKL_CR4 to which a fourth carry clock signal CK_CR4 is provided, a fifth carry clock line CKL_CR5 to which a fifth carry clock signal CK_CR5 is provided, and a sixth carry clock line CKL_CR6 to which a sixth carry clock signal CK_CR6 is provided. As shown in FIG. 7, the carry clock signals CK_CR1 to CK_CR6 may have the same or substantially the same waveform as each other. For example, the carry clock signals CK_CR1 to CK_CR6 may be a square wave that has the high level VGH (e.g., a gate-on voltage) during a ⅓ cycle, and has the low level VGL (e.g., a gate-off voltage) during a ⅔ cycle. Adjacent carry clock signals among the carry clock signals CK_CR1 to CK_CR6 may have a phase difference of 60 degrees (e.g., a ⅙ cycle). For example, the second carry clock signal CK_CR2 may have a phase delayed by 60 degrees from the first carry clock signal CK_CR1, and the third carry clock signal CK_CR3 may have a phase delayed by 60 degrees from the second carry clock signal CK_CR2.

The scan clock lines CKL_SC1 to CKL_SC6 may extend in the first direction DR1, and may be arranged along the second direction DR2. The scan clock lines CKL_SC1 to CKL_SC6 may include a first scan clock line CKL_SC1 to which a first scan clock signal CK_SC1 is provided, a second scan clock line CKL_SC2 to which a second scan clock signal CK_SC2 is provided, a third scan clock line CKL_SC3 to which a third scan clock signal CK_SC3 is provided, a fourth scan clock line CKL_SC4 to which a fourth scan clock signal CK_SC4 is provided, a fifth scan clock line CKL_SC5 to which a fifth scan clock signal CK_SC5 is provided, and a sixth scan clock line CKL_SC6 to which a sixth scan clock signal CK_SC6 is provided. As shown in FIG. 7, the scan clock signals CK_SC1 to CK_SC6 may correspond to the carry clock signals CK_CR1 to CK_CR6, respectively. For example, the first scan clock signal CK_SC1 may have the same waveform and the same phase as those of the first carry clock signal CK_CR1, and the second scan clock signal CK_SC2 may have the same waveform and the same phase as those of the second carry clock signal CK_CR2.

A first stage ST1 may be connected to the first carry clock line CKL_CR1, the first scan clock line CKL_SC1, and a first scan line SL1. The first stage ST1 may output the first carry clock signal CK_CR1 of the first carry clock line CKL_CR1 as a first carry signal CR1, and may output the first scan clock signal CK_SC1 of the first scan clock line CKL_SC1 as a first scan signal SC1 to the first scan line SL1, in response to a first scan start signal SSP1, and may suspend the output of the first scan signal SC1 in response to a fifth carry signal CR5.

A second stage ST2 may be connected to the second carry clock line CKL_CR2, the second scan clock line CKL_SC2, and a second scan line SL2. The second stage ST2 may output the second carry clock signal CK_CR2 of the second carry clock line CKL_CR2 as a second carry signal CR2, and may output the second scan clock signal CK_SC2 of the second scan clock line CKL_SC2 as a second scan signal SC2 to the second scan line SL2, in response to a second scan start signal SSP2, and may suspend the output of the second scan signal SC2 in response to a sixth carry signal CR6.

A third stage ST3 may be connected to the third carry clock line CKL_CR3, the third scan clock line CKL_SC3, and a third scan line SL3. The third stage ST3 may output the third carry clock signal CK_CR3 of the third carry clock line CKL_CR3 as a third carry signal CR3, and may output the third scan clock signal CK_SC3 of the third scan clock line CKL_SC3 as a third scan signal SC3 to the third scan line SL3, in response to a third scan start signal SSP3, and may suspend the output of the third scan signal SC3 in response to a seventh carry signal CR7.

A fourth stage ST4 may be connected to the fourth carry clock line CKL_CR4, the fourth scan clock line CKL_SC4, and a fourth scan line SL4. The fourth stage ST4 may output the fourth carry clock signal CK_CR4 of the fourth carry clock line CKL_CR4 as a fourth carry signal CR4, and may output the fourth scan clock signal CK_SC4 of the fourth scan clock line CKL_SC4 as a fourth scan signal SC4 to the fourth scan line SL4, in response to a fourth scan start signal SSP4, and may suspend the output of the fourth scan signal SC4 in response to an eighth carry signal CR8.

A fifth stage ST5 may be connected to the fifth carry clock line CKL_CR5, the fifth scan clock line CKL_SC5, and a fifth scan line SL5. The fifth stage ST5 may output the fifth carry clock signal CK_CR5 of the fifth carry clock line CKL_CR5 as a fifth carry signal CR5, and may output the fifth scan clock signal CK_SC5 of the fifth scan clock line CKL_SC5 as a fifth scan signal SC5 to the fifth scan line SL5, in response to the first carry signal CR1, and may suspend the output of the fifth scan signal SC5 in response to a ninth carry signal CR9.

A sixth stage ST6 may be connected to the sixth carry clock line CKL_CR6, the sixth scan clock line CKL_SC6, and a sixth scan line SL6. The sixth stage ST6 may output the sixth carry clock signal CK_CR6 of the sixth carry clock line CKL_CR6 as a sixth carry signal CR6, and may output the sixth scan clock signal CK_SC6 of the sixth scan clock line CKL_SC6 as a sixth scan signal SC6 to the sixth scan line SL6, in response to the second carry signal CR2, and may suspend the output of the sixth scan signal SC6 in response to a tenth carry signal CR10.

A seventh stage ST7 may be connected to the first carry clock line CKL_CR1, the first scan clock line CKL_SC1, and a seventh scan line SL7. The seventh stage ST7 may output the first carry clock signal CK_CR1 of the first carry clock line CKL_CR1 as a seventh carry signal CR7, and may output the first scan clock signal CK_SC1 of the first scan clock line CKL_SC1 as a seventh scan signal SC7 to the seventh scan line SL7, in response to the third carry signal CR3, and may suspend the output of the seventh scan signal SC7 in response to an eleventh carry signal CR11.

An eighth stage ST8 may be connected to the second carry clock line CKL_CR2, the second scan clock line CKL_SC2, and an eighth scan line SL8. The eighth stage ST8 may output the second carry clock signal CK_CR2 of the second carry clock line CKL_CR2 as an eighth carry signal CR8, and may output the second scan clock signal CK_SC2 of the second scan clock line CKL_SC2 as an eighth scan signal SC8 to the eighth scan line SL8, in response to the fourth carry signal CR4, and may suspend the output of the eighth scan signal SC8 in response to a twelfth carry signal CR12.

The clock controller 150 may include switching transistors M11 to M16 (e.g., first switching transistors).

An eleventh switching transistor M11 may be connected between the first scan clock line CKL_SC1 and the power line PL, and a gate electrode of the eleventh switching transistor M11 may be connected to the third carry clock line CKL_CR3. Referring to FIG. 7, at a time point at which the first scan clock signal CK_SC1 is changed from the high level to the low level, the eleventh switching transistor M11 may pull down the first scan clock signal CK_SC1 to the low voltage VSS (e.g., a gate-off voltage) in response to the third carry clock signal CK_CR3 having the high level. Accordingly, a falling time of the first scan clock signal CK_SC1 may be reduced, and a falling time of the first scan signal SC1 corresponding to the first scan clock signal CK_SC1 may be reduced.

A twelfth switching transistor M12 may be connected between the second scan clock line CKL_SC2 and the power line PL, and a gate electrode of the twelfth switching transistor M12 may be connected to the fourth carry clock line CKL_CR4. The twelfth switching transistor M12 may pull down the second scan clock signal CK_SC2 in response to the fourth carry clock signal CK_CR4 having the high level.

A thirteenth switching transistor M13 may be connected between the third scan clock line CKL_SC3 and the power line PL, and a gate electrode of the thirteenth switching transistor M13 may be connected to the fifth carry clock line CKL_CR5. A fourteenth switching transistor M14 may be connected between the fourth scan clock line CKL_SC4 and the power line PL, and a gate electrode of the fourteenth switching transistor M14 may be connected to the sixth carry clock line CKL_CR6. A fifteenth switching transistor M15 may be connected between the fifth scan clock line CKL_SC5 and the power line PL, and a gate electrode of the fifteenth switching transistor M15 may be connected to the first carry clock line CKL_CR1. A sixteenth switching transistor M16 may be connected between the sixth scan clock line CKL_SC6 and the power line PL, and a gate electrode of the sixteenth switching transistor M16 may be connected to the second carry clock line CKL_CR2. Each of the thirteenth switching transistor M13, the fourteenth switching transistor M14, the fifteenth switching transistor M15, and the sixteenth switching transistor M16 may pull down a corresponding scan clock signal in response to a corresponding carry clock signal.

In FIGS. 6 to 8, the gate driver 140 uses six carry clock signals CK_CR1 to CK_CR6 and six scan clock signals CK_SC1 to CK_SC6, and the clock controller 150 includes six switching transistors M11 to M16. However, the present disclosure is not limited thereto. For example, the number of scan clock signals (and carry clock signals corresponding to the scan clock signals) used in the gate driver 140 may be 2 to 5 or 7 or more. The number of switching transistors included in the clock controller 150 may be 2 to 5 or 7 or more, corresponding to the number of scan clock signals.

Figure 9:
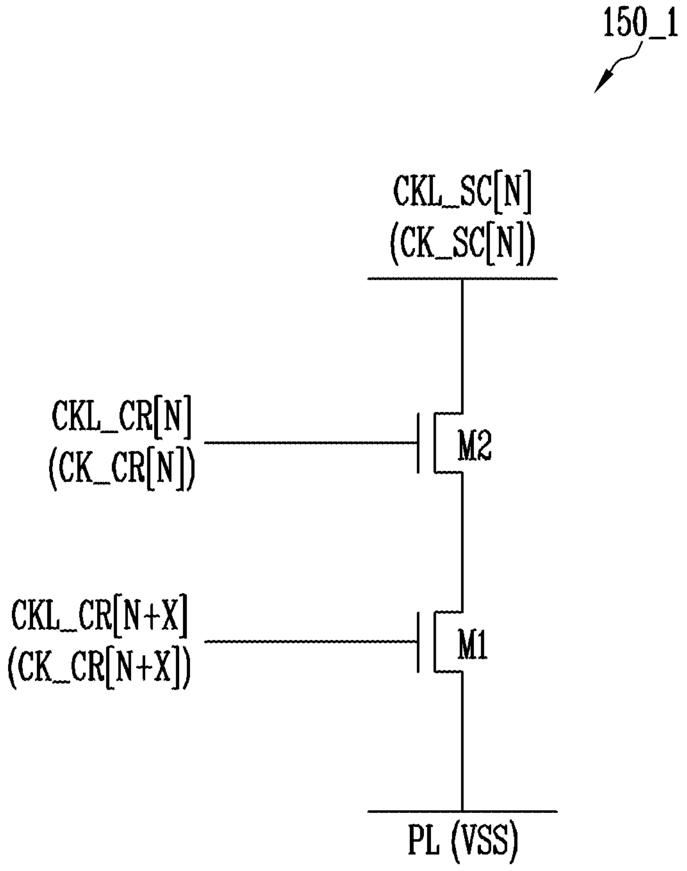
FIG. 9 is a diagram illustrating a clock controller included in the display device shown in FIG. 1 in accordance with an embodiment.
Figure 10:
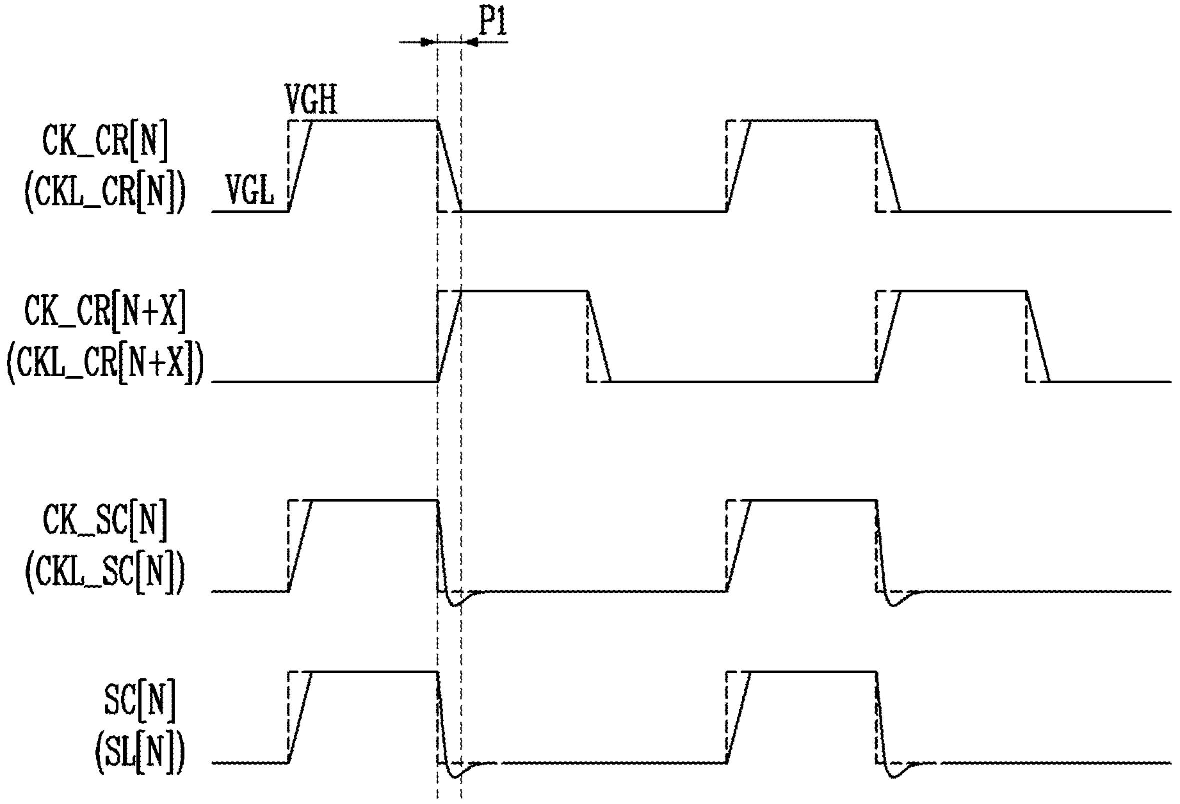
FIG. 10 is a waveform diagram illustrating an operation of the clock controller shown in FIG. 9.

FIG. 9 is a diagram illustrating the clock controller included in the display device shown in FIG. 1 in accordance with an embodiment. FIG. 10 is a waveform diagram illustrating an operation of the clock controller shown in FIG. 9.

Referring to FIGS. 4, 5, 9, and 10, a clock controller 150_1 may be the same or substantially the same as (or similar to) the clock controller 150 described above, except a second switching transistor M2 may be further included. In addition, the waveform diagram shown in FIG. 10 may be the same or substantially the same as (or similar to) the waveform diagram described above with reference to FIG. 5. Therefore, redundant description may not be repeated hereinafter, and the differences may be mainly described in more detail.

The clock controller 150_1 may include a first switching transistor M1 and a second switching transistor M2, which are connected between an Nth scan clock line CKL_SC[N] and the power line PL. A gate electrode of the first switching transistor M1 may be connected to an (N+X)th carry clock line CKL_CR[N+X], and a gate electrode of the second switching transistor M2 may be connected to an Nth carry clock line CKL_CR[N]. The first switching transistor M1 and the second switching transistor M2 may constitute a pull-down buffer.

When both an (N+X)th carry clock signal CK_CR[N+X] of the (N+X)th carry clock line CKL_CR[N+X] and an Nth carry clock signal CK_CR[N] of the Nth carry clock line CKL_CR[N] have the high level VGH, the first switching transistor M1 and the second switching transistor M2 may connect the Nth scan clock line CKL_SC[N] to the power line PL, and may pull down an Nth scan clock signal CK_SC[N] to the low voltage VSS of the power line PL.

The (N+X)th carry clock signal CK_CR[N+X] and the Nth carry clock signal CK_CR[N], which ideally without a delay, do not overlap with each other, but the clock controller 150 may pull down the Nth scan clock signal CK_SC[N] using an overlapping of the (N+X)th carry clock signal CK_CR[N+X] and the Nth carry clock signal CK_CR[N], which may occur due to a delay.

In a first period P1, the Nth scan clock signal CK_SC[N] may be changed from the high level VGH to the low level VGL, and the (N+X)th carry clock signal CK_CR[N+X] may be changed from the low level VGL to the high level VGH. In other words, in the first period P1, the Nth scan clock signal CK_SC[N] and the (N+X)th carry clock signal CK_CR[N+X] may overlap with each other, and the Nth scan clock signal CK_SC[N] and the (N+X)th carry clock signal CK_CR[N+X] may concurrently (e.g., simultaneously or substantially simultaneously) have the high level VGH.

In the first period P1, the first switching transistor M1 and the second switching transistor M2 may connect the Nth scan clock line CKL_SC[N] to the power line PL, and may pull down the Nth scan clock signal CK_SC[N] to the low voltage VSS of the power line PL. For example, the voltage level of the low voltage VSS may be lower than or equal to the low level VGL (e.g., a gate-off voltage). The Nth scan clock signal CK_SC[N] (and an Nth scan signal SC[N]) may be more rapidly (e.g., compared to the embodiment shown in FIG. 5) changed to have the gate-off voltage. In some embodiments, because the voltage level of the low voltage VSS is lower than the low level VGL, an undershooting in which a voltage level of the Nth scan clock signal CK_SC[N] (and the Nth scan signal SC[N]) becomes lower than the low level VGL may occur in the first period P1.

As described above, the clock controller 150_1 may pull down the Nth scan clock signal CK_SC[N] in response to the (N+X)th carry clock signal CK_CR[N+X] and the Nth carry clock signal CK_CR[N], thereby further reducing a falling time of each of the Nth scan clock signal CK_SC[N] and the Nth scan signal SC[N].

Figure 11:
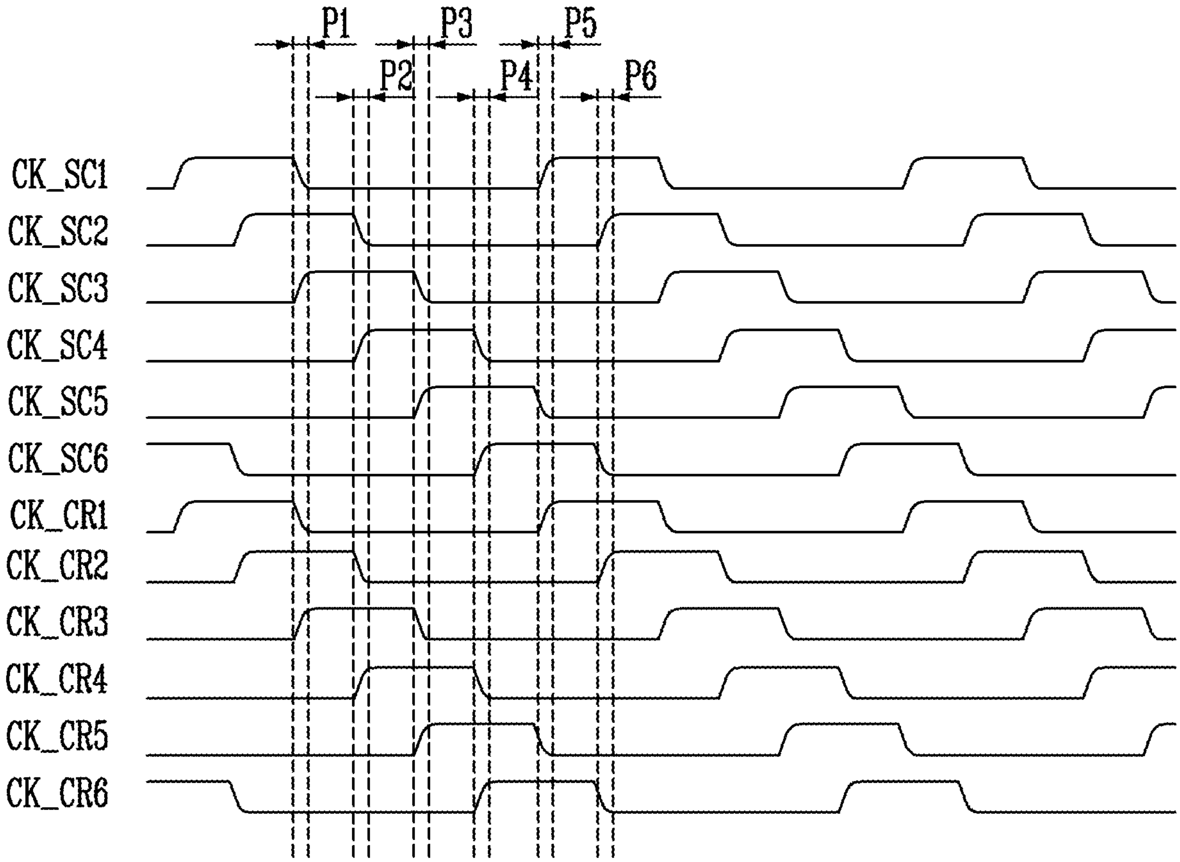
FIG. 11 is a waveform diagram illustrating signals measured in the gate driver shown in FIG. 6.
Figure 12:
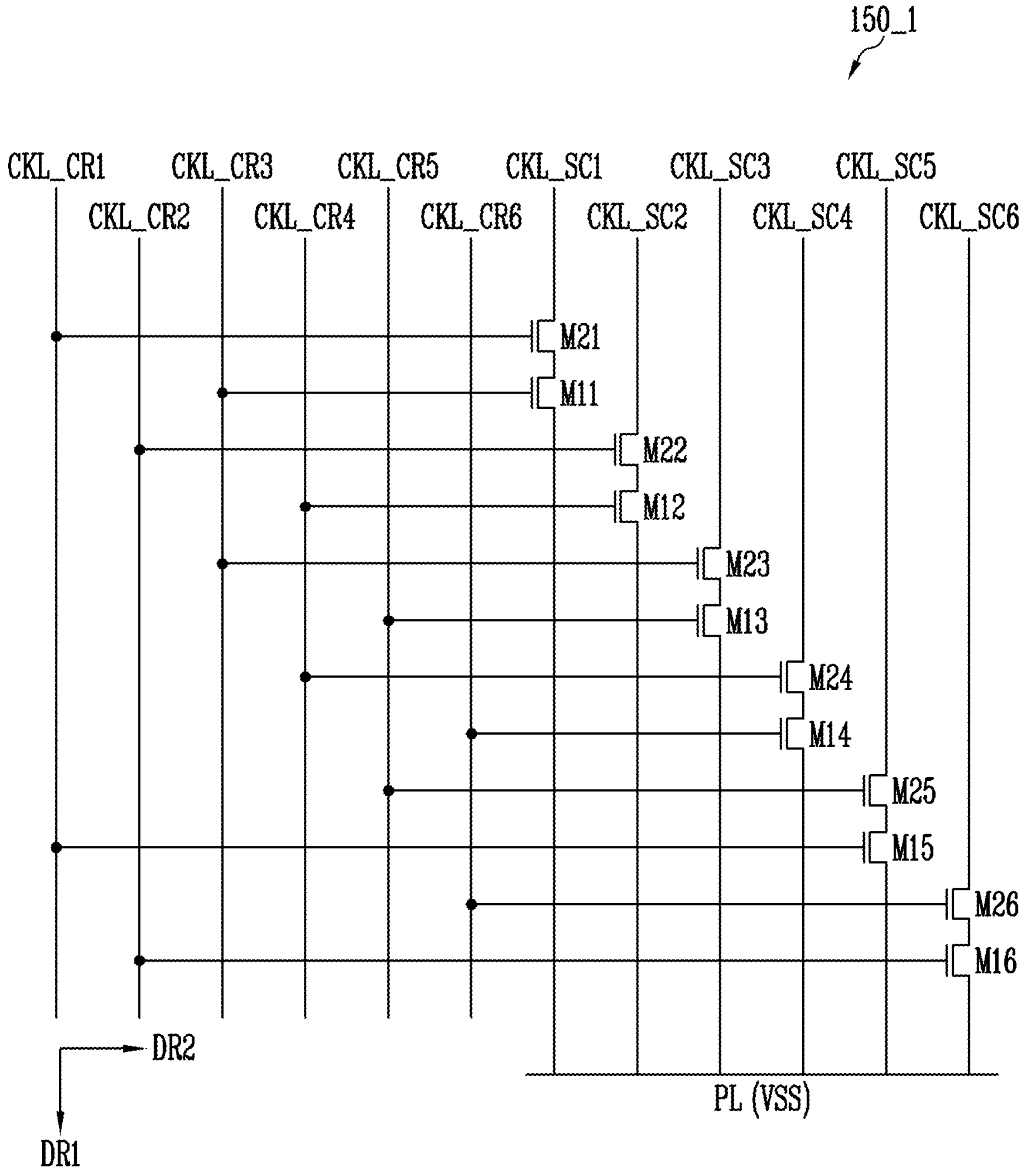
FIG. 12 is a diagram illustrating a clock controller included in the display device shown in FIG. 1 in accordance with an embodiment.

FIG. 11 is a waveform diagram illustrating signals measured in the gate driver shown in FIG. 6. FIG. 12 is a diagram illustrating the clock controller included in the display device shown in FIG. 1 in accordance with an embodiment.

Referring to FIGS. 6 to 8, 11, and 12, a clock controller 150_1 shown in FIG. 12 may be the same or substantially the same as (or similar to) the clock controller 150 described above with reference to FIG. 8, except switching transistors M21 to M26 may be further included. In addition, waveforms of clock signals CK_CR1 to CR_CK6 and CK_SC1 to CK_SC6 shown in FIG. 11 may be the same or substantially the same as (or similar to) the waveforms of the clock signals CK_CR1 to CR_CK6 and CK_SC1 to CK_SC6 described above with reference to FIG. 7, respectively. Therefore, redundant description may not be repeated hereinafter, and the differences may be mainly described in more detail.

The clock controller 150_1 may further include the switching transistors M21 to M26 (e.g., second switching transistors).

A twenty-first switching transistor M21 may be connected between the first scan clock line CKL_SC1 and the power line PL, and a gate electrode of the twenty-first switching transistor M21 may be connected to the first carry clock line CKL_CR1. In a first period P1, the first carry clock signal CK_CR1 and the third carry clock signal CK_CR3 may have the high level, and the twenty-first switching transistor M21 and the eleventh switching transistor M11 may pull down the first scan clock signal CK_SC1 to the low voltage VSS (e.g., a gate-off voltage).

A twenty-second switching transistor M22 may be connected between the second scan clock line CKL_SC2 and the power line PL, and a gate electrode of the twenty-second switching transistor M22 may be connected to the second carry clock line CKL_CR2. In a second period P2, the twenty-second switching transistor M22 and the twelfth switching transistor M12 may pull down the second scan clock signal CK_SC2.

A twenty-third switching transistor M23 may be connected between the third scan clock line CKL_SC3 and the power line PL, and a gate electrode of the twenty-third switching transistor M23 may be connected to the third carry clock line CKL_CR3. In a third period P3, the twenty-third switching transistor M23 and the thirteenth switching transistor M13 may pull down the third scan clock signal CK_SC3.

A twenty-fourth switching transistor M24 may be connected between the fourth scan clock line CKL_SC4 and the power line PL, and a gate electrode of the twenty-fourth switching transistor M24 may be connected to the fourth carry clock line CKL_CR4. In a fourth period P4, the twenty-fourth switching transistor M24 and the fourteenth switching transistor M14 may pull down the fourth scan clock signal CK_SC4.

A twenty-fifth switching transistor M25 may be connected to the fifth scan clock line CKL_SC5 and the power line PL, and a gate electrode of the twenty-fifth switching transistor M25 may be connected to the fifth carry clock line CKL_CR5. In a fifth period P5, the twenty-fifth switching transistor M25 and the fifteenth switching transistor M15 may pull down the fifth scan clock signal CK_SC5.

A twenty-sixth switching transistor M26 may be connected between the sixth scan clock line CKL_SC6 and the power line PL, and a gate electrode of the twenty-sixth switching transistor M26 may be connected to the sixth carry clock line CKL_CR6. In a sixth period P6, the twenty-sixth switching transistor M26 and the sixteenth switching transistor M16 may pull down the sixth scan clock signal CK_SC6.

Figure 13:
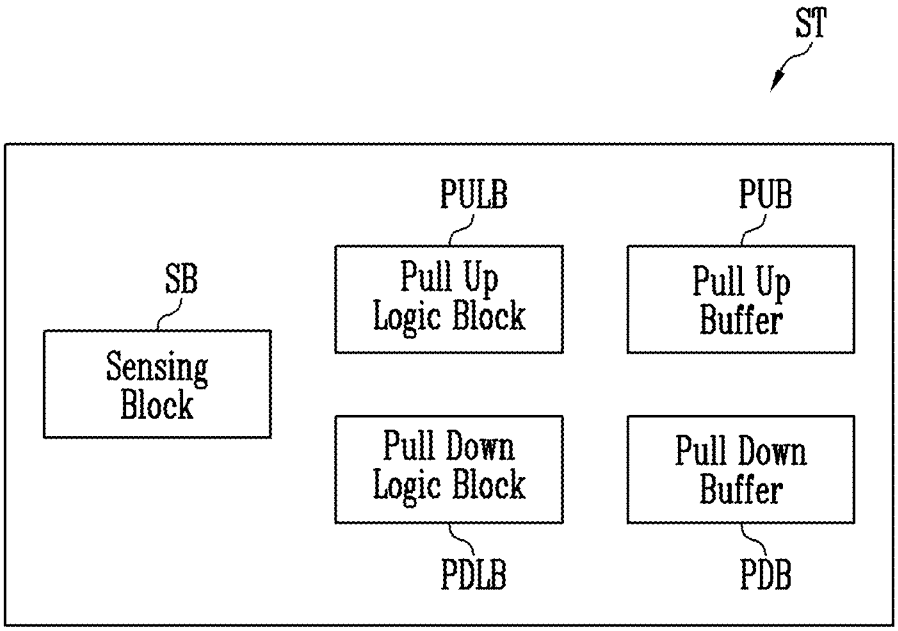
FIG. 13 is a block diagram illustrating a stage included in the gate driver in accordance with an embodiment.
Figure 14:
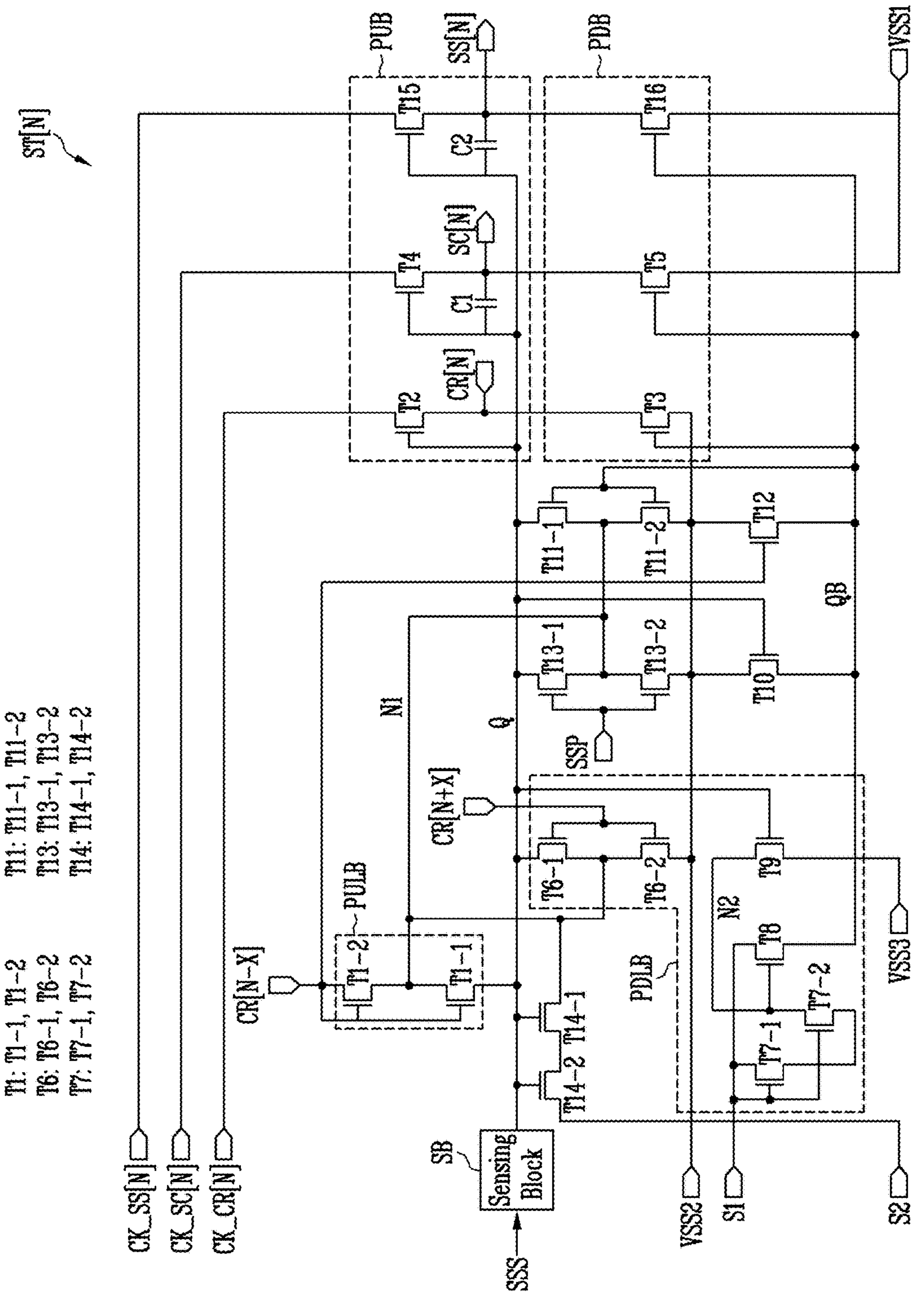
FIG. 14 is a circuit diagram illustrating a gate driver shown in FIG. 13 in accordance with an embodiment.
Figure 15:
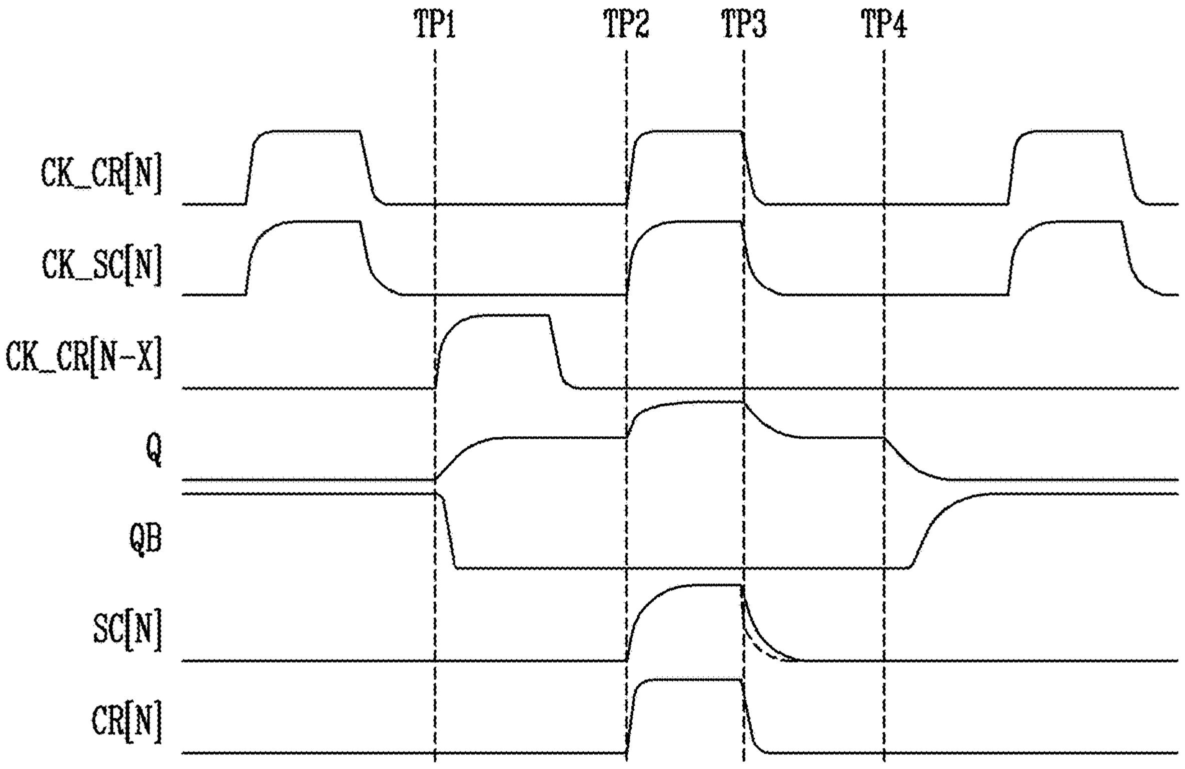
FIG. 15 is a waveform diagram illustrating an operation of the gate driver shown in FIG. 14.

FIG. 13 is a block diagram illustrating the stage included in the gate driver in accordance with an embodiment. FIG. 14 is a circuit diagram illustrating the gate driver shown in FIG. 13 in accordance with an embodiment. FIG. 15 is a waveform diagram illustrating an operation of the gate driver shown in FIG. 14.

Referring to FIGS. 1 to 3, 13, and 14, stages (e.g., the stages ST1 to ST8 shown in FIG. 6) included in the gate driver 140 may be the same or substantially the same as (or similar to) one another, and therefore, a stage ST of the stages will be described in more detail hereinafter as a representative example.

The stage ST may include a sensing block SB, a pull-up logic block PULB, a pull-up block PUB (e.g., a pull-up buffer), a pull-down logic block PDLB, and a pull-down block PDB (e.g., a pull-down buffer).

The sensing block SB may provide the gate-on voltage to a Q node (e.g., a first control node) in response to a sensing select signal SSS. In some embodiments, the sensing block SB may be omitted as needed or desired.

The pull-up logic block PULB may control a voltage of the Q node in response to a previous carry signal (e.g., an (N−X)th carry signal CR[N−X]). Here, X may be a natural number of 1 or more, and be a natural number greater than N. An example will be described in more detail hereinafter with further reference to FIG. 6. In this example, X may be 4. The pull-up block PUB may pull up an output of the stage ST to the high level (e.g., a gate-on voltage). For example, the pull-up block PUB may output an Nth carry clock signal CK_CR[N] as an Nth carry signal CR[N], and may output an Nth scan clock signal CK_SC[N] as an Nth scan signal SC[N].

The pull-down logic block PDLB may control a voltage of a QB node (e.g., a second control node) in response to a next carry signal (e.g., an (N+X)th carry signal CR[N+X]). The pull-down block PDB may pull down the output of the stage ST to the low level (e.g., a gate-off voltage) in response to the voltage of the QB node. For example, the pull-down block PDB may pull down the Nth carry signal CR[N] to a second low voltage VSS2, and may pull down the Nth scan signal SC[N] to a first low voltage VSS1.

An Nth stage ST[N], which is located on an Nth horizontal line or is connected to an Nth scan line, may include transistors T1 to T14 and a first capacitor C1.

A first transistor T1 may be diode-connected between a first carry input terminal (e.g., a previous carry line) to which the (N−X)th carry signal CR[N−X] is provided and the Q node. The first transistor T1 may include a first electrode connected to the first carry input terminal, a second electrode connected to the Q node, and a gate electrode connected to the first carry input terminal. The first transistor T1 may be include in the pull-up logic block PULB.

In an embodiment, the first transistor T1 may include a (1-1)th transistor T1-1 and a (1-2)th transistor T1-2, which are connected in series to each other between the first carry input terminal and the Q node. A first electrode of the (1-1)th transistor T1-1 and a second electrode of the (1-2)th transistor T1-2 may be connected to a first node N1. In other words, the first transistor T1 may be implemented as a double gate transistor.

A second transistor T2 may include a first electrode connected to a carry clock terminal (e.g., a carry clock line) to which the Nth carry clock signal CK_CR[N] is provided, a second electrode connected to a first output terminal (e.g., a carry line) for outputting the Nth carry signal CR[N], and a gate electrode connected to the Q node.

A third transistor T3 may include a first electrode connected to the first output terminal, a second electrode connected to a second power input terminal (e.g., a second low power line) to which the second low voltage VSS2 is provided, and a gate electrode connected to the QB node. A voltage level of the second low voltage VSS2 may be higher than a voltage level of the first low voltage VSS1, but the present disclosure is not limited thereto.

A fourth transistor T4 may include a first electrode connected to a scan clock terminal (e.g., a scan clock line) to which the Nth scan clock signal CK_SC[N] is provided, a second electrode connected to a second output terminal (e.g., a scan line) for outputting the Nth scan signal SC[N], and a gate electrode connected to the Q node.

The first capacitor C1 may be connected between the gate electrode of the fourth transistor T4 and the second output terminal.

A fifth transistor T5 may include a first electrode connected to the second output terminal, a second electrode connected to a first power input terminal (e.g., a first low power line) to which the first low voltage VSS1 is provided, and a gate electrode connected to the QB node.

The second transistor T2, the fourth transistor T4, and the first capacitor C1 may be included in the pull-up block PUB, and the third transistor T3 and the fifth transistor T5 may be included in the pull-down block PDB.

A sixth transistor T6 may include a first electrode connected to the Q node, a second electrode connected to the second low power terminal, and a gate electrode connected to a second carry input terminal (e.g., a next carry line) to which the (N+X)th carry signal CR[N+X] is applied.

In an embodiment, the sixth transistor T6 may include a (6-1)th transistor T6-1 and a (6-2)th transistor T6-2, which are connected in series to each other between the Q node and the second low power terminal. A second electrode of the (6-1)th transistor T6-1 and a first electrode of the (6-2)th transistor T6-2 may be connected to the first node N1.

A seventh transistor T7 may be diode-connected between a first control terminal (e.g., a first scan control line) to which a first scan control signal S1 is provided and a second node N2. The seventh transistor T7 may include a first electrode connected to the first control terminal, a second electrode connected to the second node N2, and a gate electrode connected to the first control terminal. The first scan control signal S1 may have the gate-on voltage.

In an embodiment, the seventh transistor T7 may include a (7-1)th transistor T7-1 and a (7-2)th transistor T7-2, which are connected in series to each other between the first control terminal and the second node N2.

An eighth transistor T8 may include a first electrode connected to the first control terminal, a second electrode connected to the QB node, and a gate electrode connected to the second node N2.

A ninth transistor T9 may include a first electrode connected to the second node N2, a second electrode connected to a third power input terminal (e.g., a third low power line) to which a third low voltage VSS3 is provided, and a gate electrode connected to the Q node. A voltage level of the third low voltage VSS3 may be equal to or substantially equal to the voltage level of the first low voltage VSS1, but the present disclosure is not limited thereto.

The sixth transistor T6, the seventh transistor T7, the eighth transistor T8, and the ninth transistor T9 may be included in the pull-down logic block PDLB.

A tenth transistor T10 may include a first electrode connected to the second power input terminal, a second electrode connected to the QB node, and a gate electrode connected to the Q node.

An eleventh transistor T11 may include a first electrode connected to the Q node, a second electrode connected to the second power input terminal, and a gate electrode connected to the QB node. In an embodiment, the eleventh transistor T11 may include an (11-1)th transistor T11-1 and an (11-2)th transistor T11-2, which are connected in series to each other between the Q node and the second power input terminal. A second electrode of the (11-1)th transistor T11-1 and a first electrode of the (11-2)th transistor T11-2 may be connected to the first node N1.

A twelfth transistor T12 may include a first electrode connected to the second power input terminal, a second electrode connected to the QB node, and a gate electrode connected to the first carry input terminal.

A thirteenth transistor T13 may include a first electrode connected to the Q node, a second electrode connected to the second power input terminal, and a gate electrode connected to a reset terminal to which a scan start signal SSP is provided. In an embodiment, the thirteenth transistor T13 may include a (13-1)th transistor T13-1 and a (13-2)th transistor T13-2, which are connected in series to each other between the Q node and the second power input terminal. A second electrode of the (13-1)th transistor T13-1 and a first electrode of the (13-2)th transistor T13-2 may be connected to the first node N1.

A fourteenth transistor T14 may include a first electrode connected to a second control terminal (e.g., a second scan control line) to which a second scan control signal S2 is provided, a second electrode connected to the first node N1, and a gate electrode connected to the Q node. When the second scan control signal S2 has the gate-on voltage, the fourteenth transistor T14 may provide the gate-on voltage to the first node N1 in response to the voltage of the Q node, and a leakage current through a transistor connected to the first node N1 may be decreased. In an embodiment, the fourteenth transistor T14 may include a (14-1)th transistor T14-1 and a (14-2)th transistor T14-2, which are connected in series to each other between the second control terminal and the first node N1.

In some embodiments, the Nth stage ST[N] may further include a fifteenth transistor T15, a sixteenth transistor T16, and a second capacitor C2.

The fifteenth transistor T15 may include a first electrode connected to a sensing clock terminal (e.g., a sensing clock line) to which an Nth sensing clock signal CK_SS[N] is provided, a second electrode connected to a third output terminal (e.g., a sensing line) for outputting an Nth sensing signal SS[N], and a gate electrode connected to the Q node.

The second capacitor C2 may be connected between the gate electrode of the fifteenth transistor T15 and the third output terminal.

The sixteenth transistor T16 may include a first electrode connected to the third output terminal, a second electrode connected to the first power input terminal to which the first low voltage VSS1 is provided, and a gate electrode connected to the QB node.

Each of the transistors T1 to T16 may include a silicon semiconductor, and may be an N-type transistor. However, the present disclosure is not limited thereto.

Referring to FIG. 15, at a first time point TP1, the (N−X)th carry signal CR[N−X] may have the high level. The first transistor T1 may be turned on, the (N−X)th carry signal CR[N−X] having the high level may be provided to the Q node, and the voltage of the Q node may be changed from the low level to the high level. The second transistor T2 and the fourth transistor T4 may be turned on in response to the voltage of the Q node. However, because the Nth carry clock signal CK_CR[N] has the low level, the Nth carry signal CR[N] may have the low level. Because the Nth scan clock signal CK_SC[N] has the low level, the Nth scan signal SC[N] may have the low level. In addition, as the tenth transistor T10 is turned on in response to the voltage of the Q node, the second low voltage VSS2 may be provided to the QB node, and the voltage of the QB node may be changed from the high level to the low level.

At a second time point TP2, the Nth carry clock signal CK_CR[N] and the Nth scan clock signal CK_SC[N] may have the high level. Each of the Nth carry signal CR[N] and the Nth scan signal SC[N] may be changed from the low level to the high level. Because the first capacitor C1 may bootstrap the Q node based on the Nth scan signal SC[N], the voltage of the Q node may be increased higher than the high level. The Nth carry signal CR[N] and the Nth scan signal SC[N] may be more rapidly changed to the high level.

At a third time point TP3, the Nth carry clock signal CK_CR[N] and the Nth scan clock signal CK_SC[N] may have the low level. Each of the Nth carry signal CR[N] and the Nth scan signal SC[N] may be changed from the high level to the low level.

However, when the Nth scan signal SC[N] is pulled down using only the Nth scan clock signal CK_SC[N] due to a load of the scan line to which the Nth scan signal SC[N] is provided, a falling time of the Nth scan signal SC[N] may be lengthened. As described above with reference to FIGS. 4 to 12, in some embodiments, the clock controller 150 pulls down the Nth scan clock signal CK_SC[N], and therefore, the falling time of the Nth scan signal SC[N] may be reduced.

At a fourth time point TP4, the sixth transistor T6 may be turned on in response to the (N+X) carry signal CR[N+X], the second low voltage VSS2 may be provided to the Q node, and the voltage of the Q node may be changed from the high level to the low level. The second transistor T2 and the fourth transistor T4 may be turned off in response to the voltage of the Q node. In other words, an output of each of the Nth carry signal CR[N] and the Nth scan signal SC[N] may be suspended.

Also, at the fourth time point TP4, the ninth transistor T9 may be turned off in response to the voltage of the Q node, the first scan control signal S1 may be provided to the QB node through the seventh transistor T7 and the eighth transistor T8, and the voltage of the QB node may be changed from the low level to the high level. The third transistor T3 and the fifth transistor T5 may be turned on in response to the voltage of the QB node, and each of the Nth carry signal CR[N] and the Nth scan signal SC[N] may be maintained or substantially maintained at the low level.

Figure 16:
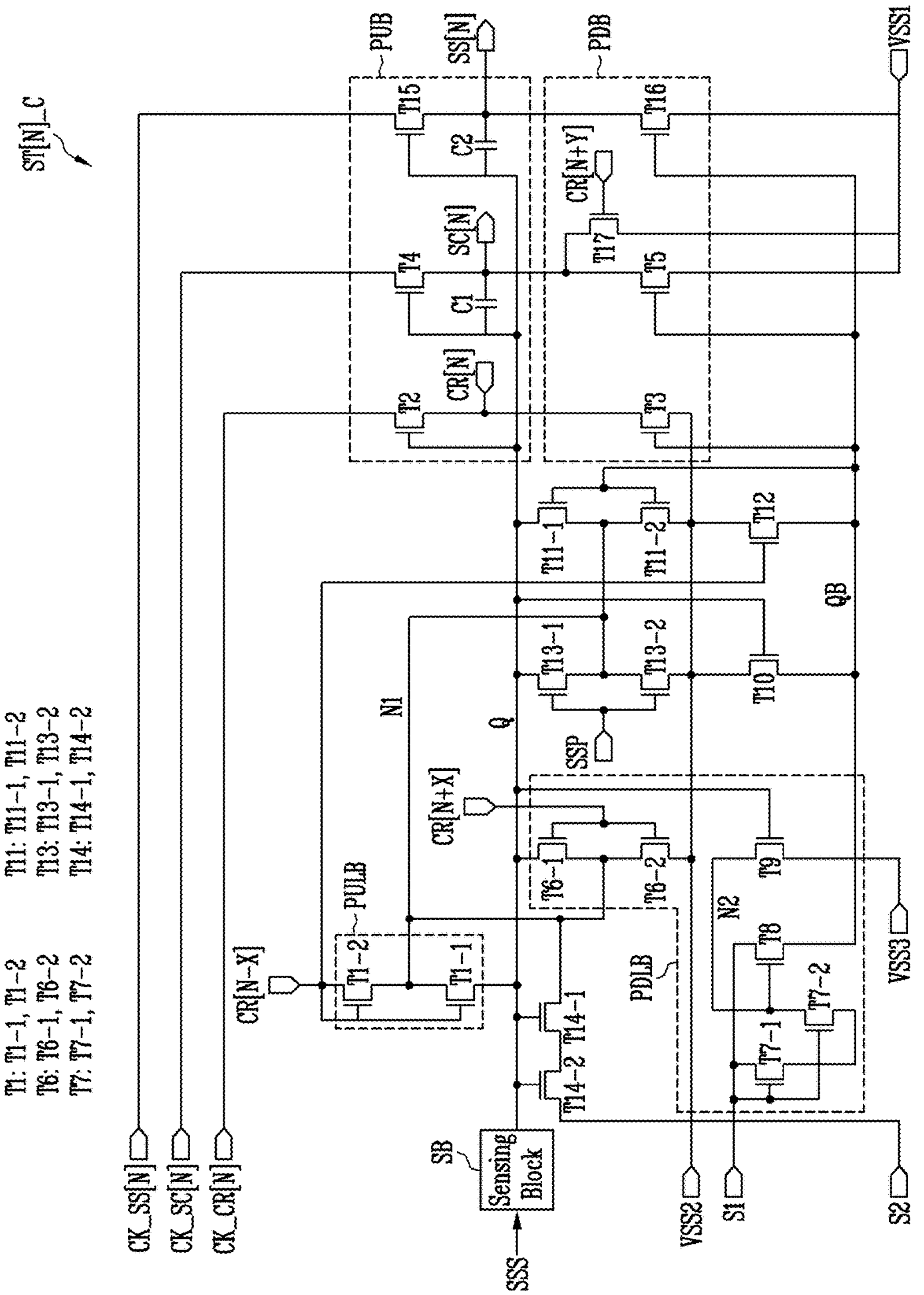
FIG. 16 is a circuit diagram illustrating a comparative example of the gate driver shown in FIG. 13.
Figure 17:
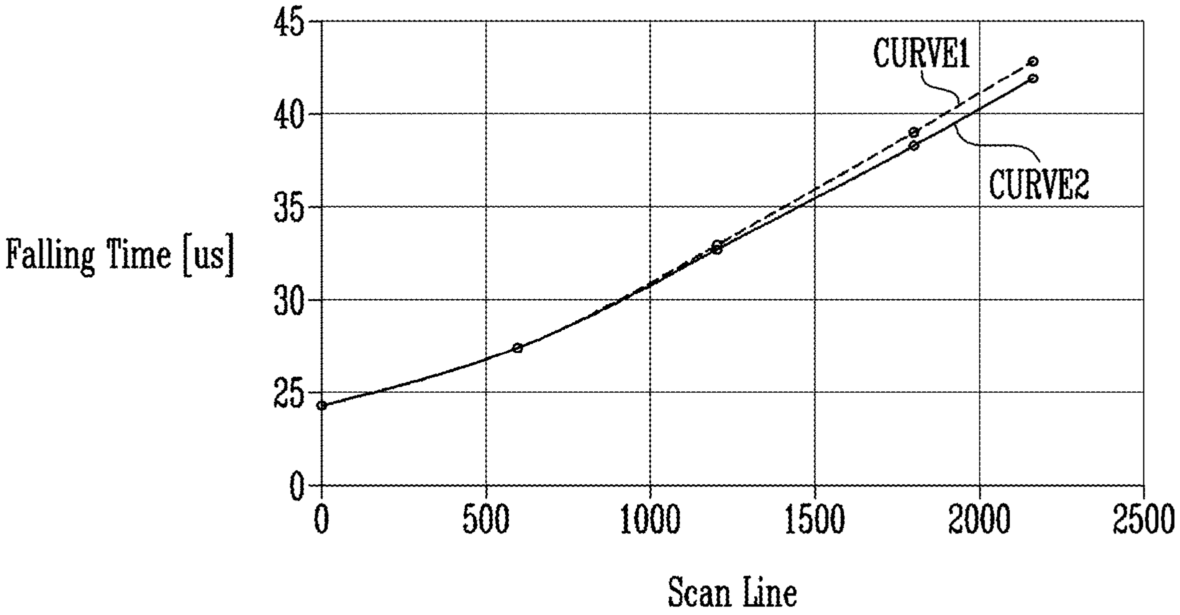
FIG. 17 is a diagram illustrating a falling time of a scan signal.

FIG. 16 is a circuit diagram illustrating a comparative example of the gate driver shown in FIG. 13. FIG. 17 is a diagram illustrating a falling time of a scan signal.

First, referring to FIGS. 14 to 16, an Nth stage ST[N]_C shown in FIG. 16 may be the same or substantially the same as (or similar to) the Nth state ST[N] shown in FIG. 14, except a seventeenth transistor T17 may be further included. Therefore, redundant description may not be repeated hereinafter, and the differences may be mainly described in more detail.

The Nth state ST[N]_C may further include the seventeenth transistor T17.

The seventeenth transistor T17 may include a first electrode connected to the second output terminal (e.g., a scan line) for outputting the Nth scan signal SC[N], a second electrode connected to the first power input terminal (e.g., a first low power line) to which the first low voltage VSS1 is provided, and a gate electrode connected to a third carry input terminal (e.g., a next carry line) to which an (N+Y)th carry signal CR[N+Y] is applied. Here, Y may be a natural number smaller than X. For example, X may be 4 and Y may be 2.

The seventeenth transistor T17 may pull down the Nth scan signal SC[N] to the first low voltage VSS1 in response to the (N+Y)th carry signal CR[N+Y]. Therefore, the Nth scan signal SC[N] may be rapidly changed from the high level to the low level.

Referring to FIG. 17, a first curve CURVE1 represents falling times of scan signals, which are measured in the scan lines SL1 to SLi of the display device 100 shown in FIG. 1 including the Nth stage ST[N] shown in FIG. 14. For example, with respect to a 4K resolution, i in SLi may be 2160. Referring to FIGS. 2 and 17, the number of the scan lines may become larger as they become more distant from the pad portion PDP. The falling time of the scan signal may be increased from about 25 □ to about 43 □ as they become more distant from the pad portion PDP.

A second curve CURVE2 represents falling times of scan signals, which are measured in scan lines of a display device in accordance with a comparative example including the Nth stage ST[N]_C shown in FIG. 16, and does not include the clock controller 150 shown in FIG. 1. The falling time of the scan signal may be increased from about 25 □ to about 42 □ as they become more distant from the pad portion PDP. With respect to a scan line that is most distant from the pad portion PDP, a falling time in the display device 100 shown in FIG. 1 may be longer by about 1 □ than a falling time in the display device in accordance with the comparative example, but the difference is a level of about 2.5%. In other words, in a falling time reduction, the display device 100 shown in FIG. 1 may have an effect similar to an effect of the display device in accordance with the comparative example.

The display device in accordance with the comparative example includes the seventeenth transistor T17 for each stage. For example, the display device in accordance with the comparative example may include 2160 transistors with respect to the 4K resolution. However, the display device 100 (and the gate driver 140) shown in FIG. 1 includes the clock controller 150 (e.g., as a circuit commonly used by the stages, including, for example, six transistors with reference to FIG. 8), and does not include the seventeenth transistor T17. Thus, the first area A1 shown in FIGS. 2 and 3 (e.g., which may be referred to as a dead space) may be reduced.

As described above, the display device 100 (and the gate driver 140) in accordance with some embodiments of the present disclosure may not include the seventeenth transistor T17 for pulling down a scan signal for each stage, and thus, a dead space may be reduced.

Figure 18:
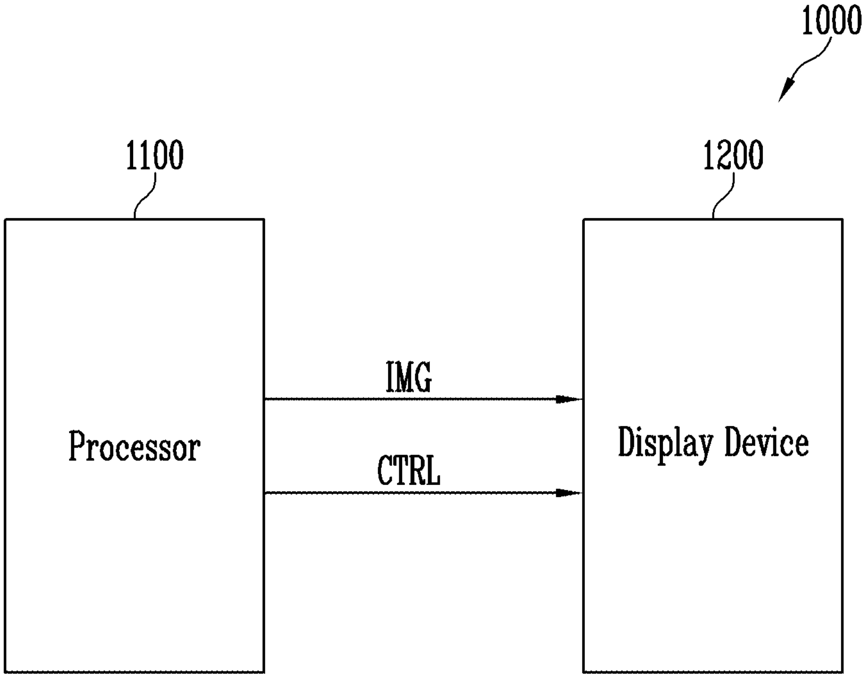
FIG. 18 is a block diagram illustrating a display system in accordance with an embodiment.

FIG. 18 is a block diagram illustrating a display system in accordance with an embodiment.

Referring to FIG. 18, a display system 1000 (e.g., an electronic device) may include a processor 1100 and a display device 1200.

The processor 1100 may perform various suitable tasks and various suitable calculations. In some embodiments, the processor 1100 may include an Application Processor (AP), a Graphics Processing Unit (GPU), a microprocessor, a Central Processing Unit (CPU), and/or the like. The processor 1100 may be connected to other components of the display system 1000 through a bus system to control the components of the display system 1000.

The processor 1100 may transmit image data IMG and a control signal CTRL to the display device 1200. The display device 1200 may display an image based on the image data IMG and the control signal CTRL. The display device 1200 may be configured the same or substantially the same as that of the display device 100 described above with reference to FIG. 1. The image data IMG and the control signal CTRL may be provided as the input data Din and the control signal CS, respectively, which are shown in FIG. 1.

The display system 1000 may include a computing system for providing an image display function, such as a smart watch, a mobile phone, a smartphone, a portable computer, a tablet personal computer (PC), a watch phone, an automotive display, a smart glass, a portable multimedia player (PMP), a navigation system, or an ultra mobile computer (UMPC). The display system 1000 may include at least one of a head mounted display (HMD) device, a virtual reality (VR) device, a mixed reality (MR) device, or an augmented reality (AR) device.

FIGS. 19 through 22 are perspective views illustrating application examples of the display system shown in FIG. 18 in accordance with some embodiments.

Figure 19:
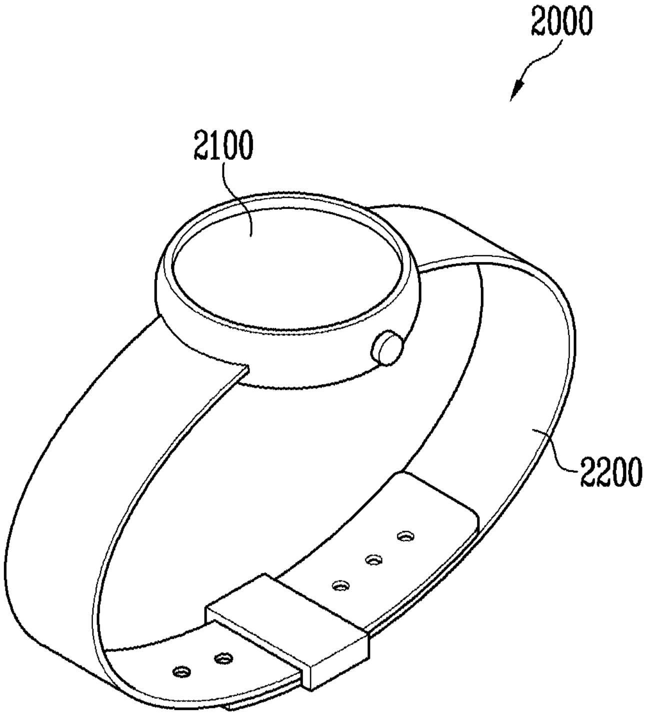
FIGS. 19-22 are perspective views illustrating application examples of the display system shown in FIG. 18 in accordance with some embodiments.

Referring to FIG. 19, the display system 1000 shown in FIG. 18 may be applied to a smart watch 2000 including a display part 2100 and a strap part 2200.

The smart watch 2000 may be a wearable electronic device. For example, the smart watch 2000 may have a structure in which the strap part 2200 is mounted on a wrist of a user. The display system 1000 and/or the display device 1200 may be applied to the display part 2100, so that image data including time information can be provided to the user.

Figure 20:
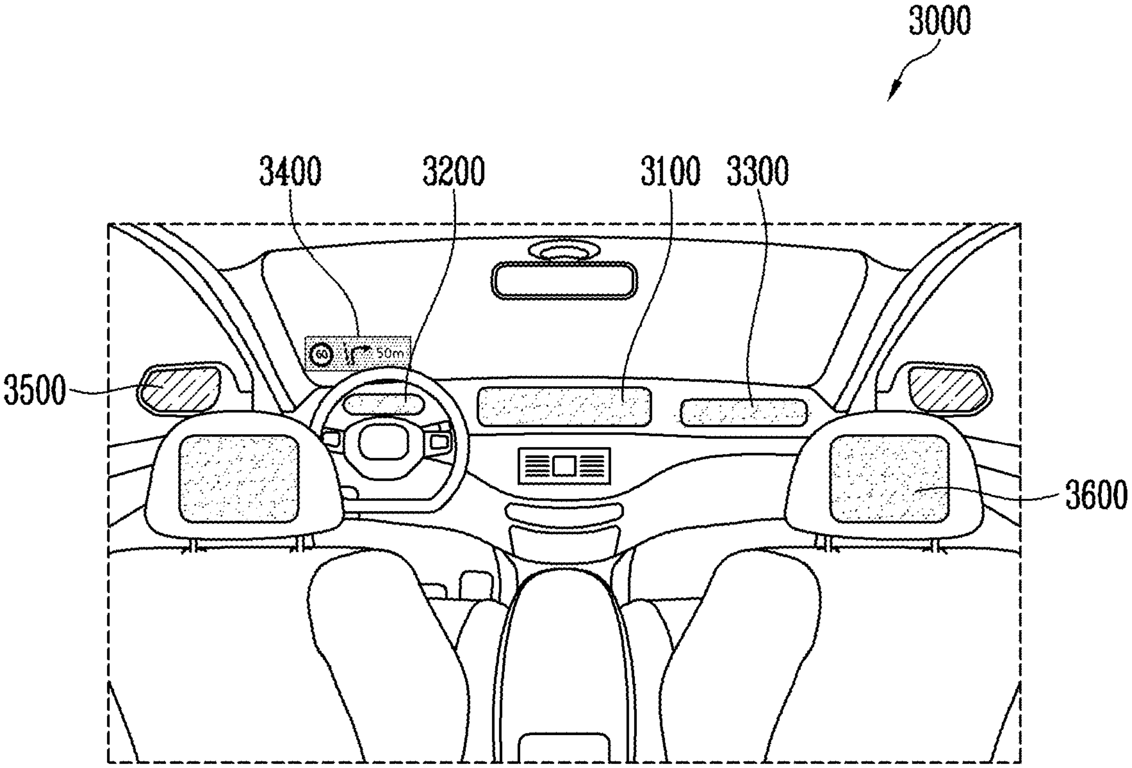

Referring to FIG. 20, the display system 1000 shown in FIG. 18 may be applied to an automotive display system 3000. The automotive display system 3000 may include a computing system provided at the inside/outside of a vehicle to provide image data.

For example, the display system 1000 and/or the display device 1200 may be applied to at least one of an infotainment panel 3100, a cluster 3200, a co-driver display 3300, a heads-up display 3400, a side mirror display 3500, or a rear seat display 3600, which are provided in the vehicle.

Figure 21:
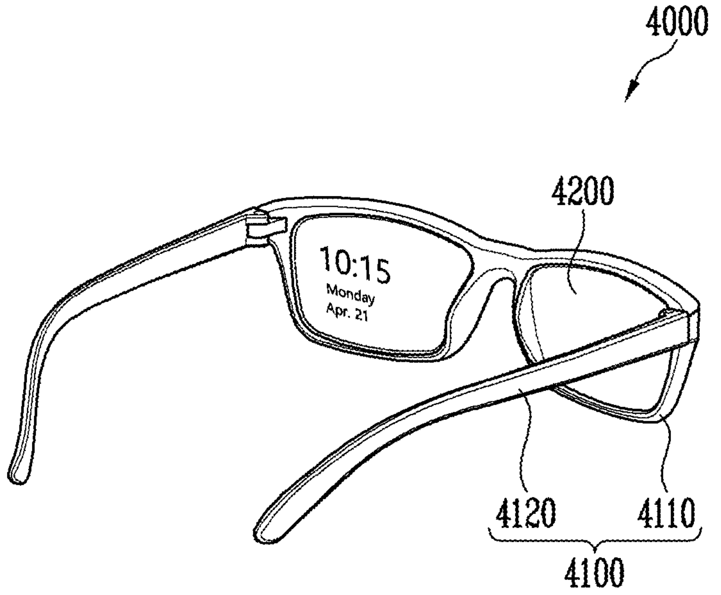

Referring to FIG. 21, the display system 1000 shown in FIG. 18 may be applied to smart glasses 4000. The smart glasses 4000 may be a wearable electronic device that can be worn on the face of a user. For example, the smart glasses 4000 may be a wearable device for Augmented Reality (AR).

The smart glasses 4000 may include a frame 4100 and a lens part 4200. The frame 4100 may include a housing 4110 for supporting the lens part 4200, and a leg part 4120 for allowing the user to wear the smart glasses 4000. The leg part 4120 may be connected to the housing 4110 through a hinge to be folded or unfolded with respect to the housing 4110.

A battery, a touch pad, a microphone, a camera, and the like may be built in the frame 4100. In addition, a projector for outputting light, a processor for controlling a light signal, and the like may be built in the frame 4100.

The lens part 4200 may be an optical member that allows light to be transmitted through the lens part 4200, or allows light to be reflected by the lens part 4200. For example, the lens part 4200 may include glass, a transparent synthetic resin, and the like.

In order to enable the eyes of the user to recognize visual information, the lens part 4200 may allow an image caused by a light signal transmitted from the projector of the frame 4100 to be reflected by a rear surface (e.g., a surface in a direction facing the eyes of the user) of the lens part 4200. For example, the user may recognize information including time, data, and the like, which are displayed on the lens part 4200. The projector and/or the lens part 4200 may be a kind of display device. The display device 1200 may be applied to the projector and/or the lens part 4200.

Figure 22:
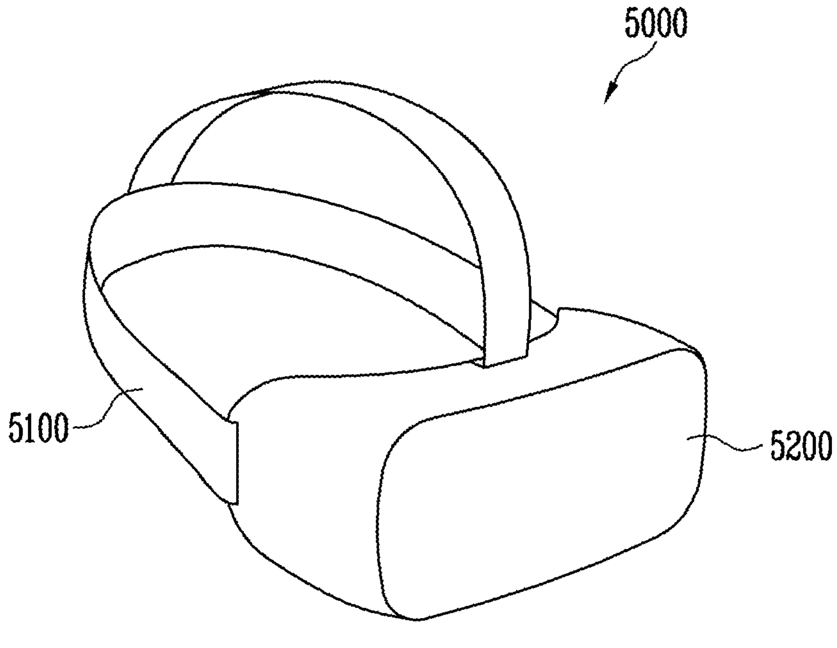

Referring to FIG. 22, the display system 1000 shown in FIG. 18 may be applied to a head mounted display device 5000.

The head mounted display device 5000 may be a wearable electronic device that can be worn on the head of a user. For example, the head mounted display device 5000 may be a wearable device for virtual reality (VR) or mixed reality (MR).

The head mounted display device 5000 may include a head mounted band 5100 and a display accommodating case 5200. The head mounted band 5100 may be connected to the display accommodating case 5200. The head mounted band 5100 may include a horizontal band and/or a vertical band, which may be used to fix the head mounted display device 5000 to the head of the user. The horizontal band may be configured to surround (e.g., around a periphery of) a side portion of the head of the user, and the vertical band may be configured to surround (e.g., around a periphery of) an upper portion of the head of the user. However, the present disclosure is not limited thereto. For example, the head mounted band 5100 may be implemented as a glasses frame, a helmet, or the like.

The display device accommodating case 5200 may accommodate the display system 1000 and/or the display device 1200.

In accordance with some embodiments of the present disclosure, the gate driver and the display device may include a clock controller, and the clock controller may pull down a scan clock signal using a carry clock signal. Thus, the falling time of a scan signal corresponding to the scan clock signal may be reduced.

In accordance with some embodiments of the present disclosure, the gate driver and the display device may not include a transistor in each stage for pulling down a scan signal, and thus, a dead space may be reduced.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A display device comprising:
a display panel comprising pixels connected to scan lines;
a gate driver comprising stages, a stage from among the stages being configured to:
provide, as a carry signal, a carry clock signal of a carry clock line to a next stage from among the stages; and
provide, as a scan signal, a scan clock signal of a scan clock line to a corresponding scan line from among the scan lines in response to a previous carry signal of a previous stage from among the stages; and
a clock controller configured to connect the scan clock line to a power line in response to the carry clock signal, the power line being configured to provide a constant voltage.

2. The display device of claim 1, wherein each of the carry clock line and the scan clock line extends from a first side of the display panel, at which a pad is located, to a second side of the display panel, and
wherein the clock controller is located adjacent to the second side of the display panel.

3. The display device of claim 2, wherein the gate driver further comprises a dummy stage configured to provide a carry signal to a previous stage, the dummy stage not being connected to the scan lines, and
wherein the clock controller is located adjacent to the dummy stage.

4. The display device of claim 3, wherein the gate driver comprises the clock controller.

5. The display device of claim 1, wherein the stage is configured to output, as the carry signal, a first carry clock signal of a first carry clock line, and
wherein the clock controller comprises a first switching transistor connected between the scan clock line and the power line, the first switching transistor comprising a gate electrode connected to a second carry clock line.

6. The display device of claim 5, wherein the first switching transistor comprises an oxide semiconductor.

7. The display device of claim 5, wherein each of the carry clock signal and the scan clock signal comprises a square wave cyclically having a gate-on voltage and a gate-off voltage, and
wherein the carry clock signal of the second carry clock line has a phase delayed by a pulse width of the scan clock signal having the gate-on voltage compared to the first carry clock signal of the first carry clock line.

8. The display device of claim 7, wherein the power line is configured to receive the gate-off voltage, and
wherein the clock controller is configured to connect the scan clock line to the power line in response to the carry clock signal having the gate-on voltage to reduce a falling time of each of the scan clock signal and the scan signal.

9. The display device of claim 1, wherein the display panel further comprises:
first to sixth carry clock lines configured to receive first to sixth carry clock signals, respectively; and
first to sixth scan clock lines configured to receive first to sixth scan clock signals, respectively,
wherein the first to sixth carry clock signals have the same waveforms as each other, and different phases from each other,
wherein the first to sixth scan clock signals have the same waveforms as each other, and the same phases as those of the first to sixth carry clock signals, respectively, and
wherein the clock controller is configured to:
pull down the first scan clock signal in response to the third carry clock signal;
pull down the second scan clock signal in response to the fourth carry clock signal;
pull down the third scan clock signal in response to the fifth carry clock signal;
pull down the fourth scan clock signal in response to the sixth carry clock signal;
pull down the fifth scan clock signal in response to the first carry clock signal; and
pull down the sixth scan clock signal in response to the second carry clock signal.

10. The display device of claim 9, wherein the clock controller comprises:
an eleventh switching transistor connected between the first scan clock line and the power line, the eleventh switching transistor comprising a gate electrode connected to the third carry clock line;
a twelfth switching transistor connected between the second scan clock line and the power line, the twelfth switching transistor comprising a gate electrode connected to the fourth carry clock line;
a thirteenth switching transistor connected between the third scan clock line and the power line, the thirteenth switching transistor comprising a gate electrode connected to the fifth carry clock line;
a fourteenth switching transistor connected between the fourth scan clock line and the power line, the fourteenth switching transistor comprising a gate electrode connected to the sixth carry clock line;
a fifteenth switching transistor connected between the fifth scan clock line and the power line, the fifteenth switching transistor comprising a gate electrode connected to the first carry clock line; and
a sixteenth switching transistor connected between the sixth scan clock line and the power line, the sixteenth switching transistor comprising a gate electrode connected to the second carry clock line.

11. The display device of claim 1, wherein the stage is configured to output, as the carry signal, a first carry clock signal of a first carry clock line,
wherein the clock controller comprises a first switching transistor and a second switching transistor connected in series to each other between the scan clock line and the power line,
wherein a gate electrode of the first switching transistor is connected to a second carry clock line, and
wherein a gate electrode of the second switching transistor is connected to the first carry clock line.

12. The display device of claim 11, wherein each of the carry clock signal and the scan clock signal comprises a square wave cyclically having a gate-on voltage and a gate-off voltage,
wherein the carry clock signal of the first carry clock line has the same waveform and the same phase as those of the scan clock signal, and
wherein the carry clock signal of the second carry clock line has a phase delayed by a pulse width of the carry clock signal having the gate-on voltage compared to the carry clock signal of the first carry clock line.

13. The display device of claim 12, wherein the constant voltage of the power line has a voltage level lower than a voltage level of the gate-off voltage.

14. The display device of claim 1, wherein the stage comprises:

a first transistor diode-connected between a previous carry line configured to receive the previous carry signal and a Q node;

a second transistor connected between the carry clock line and a first output terminal configured to output the carry signal, the second transistor comprising a gate electrode connected to the Q node;

a third transistor connected between the first output terminal and a low power line, the third transistor comprising a gate electrode connected to a QB node;

a fourth transistor connected between the scan clock line and a second output terminal configured to output the scan signal, the fourth transistor comprising a gate electrode connected to the Q node; and a fifth transistor connected between the second output terminal and the low power line, the fifth transistor comprising a gate electrode connected to the QB node, and wherein the stage does not comprise a transistor connecting the second output terminal and the low power line to each other in response to a next carry signal of a next stage.

15. A gate driver comprising:

stages; and a clock control circuit, wherein a stage from among the stages is configured to:

provide, as a carry signal, a carry clock signal of a carry clock line to a next stage; and output, as a scan signal, a scan clock signal of a scan clock line in response to a previous carry signal of a previous stage, and wherein the clock control circuit is configured to pull down the scan clock line to a gate-off voltage in response to the carry clock signal.

16. The gate driver of claim 15, further comprising a dummy stage configured to provide a carry signal to a previous stage, and not output a scan signal, wherein the clock control circuit is located adjacent to the dummy stage.

17. The gate driver of claim 15, wherein the stage is configured to output, as the carry signal, a first carry clock signal of a first carry clock line, and wherein the clock control circuit comprises a first switching transistor connected between the scan clock line and a power line configured to provide a constant voltage, the first switching transistor comprising a gate electrode connected to a second carry clock line.

18. The gate driver of claim 17, wherein each of the carry clock signal and the scan clock signal comprises a square wave cyclically having a gate-on voltage and a gate-off voltage, and wherein the carry clock signal of the second carry clock line has a phase delayed by a pulse width of the scan clock signal having the gate-on voltage compared to the first carry clock signal of the first carry clock line.

19. The gate driver of claim 15, wherein the stage is configured to output, as the carry signal, a first carry clock signal of a first carry clock line, wherein the clock control circuit comprises a first switching transistor and a second switching transistor connected in series to each other between the scan clock line and a power line configured to provide a constant voltage, wherein a gate electrode of the first switching transistor is connected to a second carry clock line, wherein a gate electrode of the second switching transistor is connected to the first carry clock line, wherein each of the carry clock signal and the scan clock signal comprises a square wave cyclically having a gate-on voltage and a gate-off voltage, wherein the carry clock signal of the first carry clock line has the same waveform and the same phase as those of the scan clock signal, and wherein the carry clock signal of the second carry clock line has a phase delayed by a pulse width of the carry clock signal having the gate-on voltage compared to the carry clock signal of the first carry clock line.

20. An electronic device, comprising:

a processor configured to provide input image data; and a display device configured to display an image based on the input image data, and comprising:

a display panel comprising pixels connected to scan lines;

a gate driver comprising stages, a stage from among the stages being configured to:

provide, as a carry signal, a carry clock signal of a carry clock line to a next stage from among the stages; and provide, as a scan signal, a scan clock signal of a scan clock line to a corresponding scan line from among the scan lines in response to a previous carry signal of a previous stage from among the stages; and a clock controller configured to connect the scan clock line to a power line in response to the carry clock signal, the power line being configured to provide a constant voltage.

* * * * *